United States Patent
Ji et al.

(10) Patent No.: US 10,420,167 B2
(45) Date of Patent: Sep. 17, 2019

(54) CELLULAR CONNECTION SHARING

(71) Applicants: AT&T Intellectual Property I, L.P., Atlanta, GA (US); Board of Trustees of Michigan State University, East Lansing, MI (US)

(72) Inventors: Lusheng Ji, Randolph, NJ (US); Jeffrey Pang, Berkeley, CA (US); Jia Wang, Randolph, NJ (US); Shobha Venkataraman, Jersey City, NJ (US); Muhammad Zubair Shafiq, San Diego, CA (US); Xiang-Yang Alex Liu, Okemos, MI (US)

(73) Assignees: AT&T INTELLECTUAL PROPERTY I, L.P., Atlanta, GA (US); BOARD OF TRUSTEES OF MICHIGAN STATE UNIVERSITY, East Lansing, MI (US)

( * ) Notice: Subject to any disclaimer, the term of this patent is extended or adjusted under 35 U.S.C. 154(b) by 0 days.

(21) Appl. No.: 15/405,470

(22) Filed: Jan. 13, 2017

(65) Prior Publication Data
US 2017/0135152 A1     May 11, 2017

Related U.S. Application Data

(63) Continuation of application No. 14/103,471, filed on Dec. 11, 2013, now Pat. No. 9,585,177.

(51) Int. Cl.
*H04W 76/38*     (2018.01)
*H04W 8/00*     (2009.01)
(Continued)

(52) U.S. Cl.
CPC .......... *H04W 76/38* (2018.02); *H04W 8/005* (2013.01); *H04W 28/0289* (2013.01); *H04W 76/14* (2018.02); *H04W 88/04* (2013.01)

(58) Field of Classification Search
CPC ..... H04W 84/12; H04W 28/08; H04W 76/02; H04L 43/16
See application file for complete search history.

(56) References Cited

U.S. PATENT DOCUMENTS 5,721,762 A     2/1998  Sood
7,239,632 B2    7/2007  Kalavade et al.
(Continued)

FOREIGN PATENT DOCUMENTS

CA      2800184 A1   12/2011
CN    102932745 A     2/2013
(Continued)

OTHER PUBLICATIONS

Bao et al. "DataSpotting: Exploiting Naturally Clustered Mobile Devices to Offload Cellular Traffic." 2013 Proceedings IEEE INFOCOM, Apr. 14-19, 2013, pp. 420-424.
(Continued)

*Primary Examiner* — Ernest G Tacsik
(74) *Attorney, Agent, or Firm* — Amin, Turocy & Watson, LLP

(57) ABSTRACT

Techniques for sharing a cellular network connection amongst multiple devices over a local area network are provided that reduce cellular network load during crowded events. In an aspect, a devices is configure to perform operations that include scanning an area for another device that has established a first wireless cellular connection with a cellular network device of a cellular network and that enables an indirect connection of the device to the cellular network device via a direct connection of the device to the other device via a local network device. The operations further include, in response to identifying the other device as a result of the scanning, sending a request to the other device to connect to the other device via the local network device
(Continued)

and to receive the indirect connection to the cellular network device.

20 Claims, 11 Drawing Sheets

(51) Int. Cl.
*H04W 76/14* (2018.01)
*H04W 28/02* (2009.01)
*H04W 88/04* (2009.01)

(56) References Cited

U.S. PATENT DOCUMENTS

| | | | |
|---|---|---|---|
| 7,266,383 B2 | 9/2007 | Anderson | |
| 7,359,724 B2 | 4/2008 | Torvinen | |
| 7,382,771 B2 | 6/2008 | Leblanc et al. | |
| 7,974,194 B2 | 7/2011 | Tripathi et al. | |
| 8,340,057 B2 | 12/2012 | Abujbara | |
| 8,375,430 B2 | 2/2013 | Grewal et al. | |
| 8,447,813 B2 | 5/2013 | Redmond | |
| 8,467,376 B2 | 6/2013 | Kubler et al. | |
| 8,477,639 B2 | 7/2013 | Sewall et al. | |
| 8,526,885 B2 | 9/2013 | Lin et al. | |
| 8,539,086 B2 | 9/2013 | Mallet et al. | |
| 8,848,579 B1* | 9/2014 | Reeves | H04M 15/00 370/271 |
| 2002/0172178 A1* | 11/2002 | Suzuki | H04L 12/5692 370/338 |
| 2006/0019665 A1 | 1/2006 | Aghvami et al. | |
| 2006/0025181 A1 | 2/2006 | Kalofonos et al. | |
| 2007/0060125 A1 | 3/2007 | Rahim | |
| 2007/0115906 A1 | 5/2007 | Gao et al. | |
| 2007/0281683 A1 | 12/2007 | Goulet et al. | |
| 2008/0032738 A1 | 2/2008 | Boyer et al. | |
| 2008/0042912 A1 | 2/2008 | Lee | |
| 2009/0238090 A1 | 9/2009 | Sambhwani et al. | |
| 2010/0020753 A1 | 1/2010 | Fulknier et al. | |
| 2010/0082784 A1 | 4/2010 | Rosenblatt et al. | |
| 2010/0229229 A1* | 9/2010 | Kumar | H04L 63/10 726/7 |
| 2010/0284316 A1 | 11/2010 | Sampathkumar | |
| 2011/0134833 A1 | 6/2011 | Gogic | |
| 2011/0294502 A1 | 12/2011 | Oerton | |
| 2012/0044915 A1 | 2/2012 | Oerton | |
| 2012/0079111 A1 | 3/2012 | Luukkala et al. | |
| 2012/0135711 A1 | 5/2012 | Jabara | |
| 2012/0185520 A1 | 7/2012 | Iarocci et al. | |
| 2012/0210001 A1* | 8/2012 | Ryerson | H04W 12/08 709/225 |
| 2012/0239483 A1 | 9/2012 | Yankovich et al. | |
| 2012/0307725 A1 | 12/2012 | Yamada et al. | |
| 2013/0016648 A1* | 1/2013 | Koskela | H04W 92/20 370/315 |
| 2013/0080560 A1 | 3/2013 | Sayankar et al. | |
| 2013/0090124 A1 | 4/2013 | Panchal et al. | |
| 2013/0130693 A1* | 5/2013 | Salvador | H04W 48/20 455/437 |
| 2013/0183935 A1 | 7/2013 | Holostov et al. | |
| 2013/0201830 A1* | 8/2013 | Wang | H04W 4/70 370/235 |
| 2013/0229944 A1* | 9/2013 | Montemurro | H04W 4/206 370/254 |
| 2014/0226487 A1* | 8/2014 | Forssell | H04W 36/22 370/235 |

FOREIGN PATENT DOCUMENTS

| | | |
|---|---|---|
| RU | 2334362 C2 | 9/2008 |
| WO | 0186988 A1 | 11/2001 |
| WO | 2005053266 A2 | 6/2005 |
| WO | 2012053938 A2 | 4/2012 |

OTHER PUBLICATIONS

Ding et al. "NAO: A Framework to Enable Efficient Mobile Offloading." Middleware PDT Workshop, Dec. 12, 2011, Lisbon, Portugal, 2 pages.
Usha et al. "Capacity Crunch: Can MoSoNets Offload Data Solve This." IJCSI International Journal of Computer Science Issues. vol. 10, Issue 3, No. 2. May 2013. pp. 96-104.
Office Action for U.S. Appl. No. 14/103,471 dated Jun. 28, 2016, 109 pages.
Office Action for U.S. Appl. No. 14/103,471 dated Mar. 9, 2016, 76 pages.
Office Action for U.S. Appl. No. 14/103,471 dated Oct. 6, 2015, 69 pages.
Office Action for U.S. Appl. No. 14/103,471 dated May 15, 2015, 60 pages.

* cited by examiner

CELLULAR CONNECTION SHARING

RELATED APPLICATION

This patent application is a continuation of, and claims priority to, U.S. patent application Ser. No. 14/103,471, filed Dec. 11, 2013, and entitled, "CELLULAR CONNECTION SHARING," the entirety of which application is hereby incorporated by reference herein.

TECHNICAL FIELD

This disclosure relates generally to an opportunistic cellular network connection sharing scheme that reduces cellular network load during crowded events.

BACKGROUND

Cellular data networks are often overloaded during crowded events such as concerts, conferences, and sporting events, resulting in a poor user experience. Although such events are often short lived, they create a dramatic demand for communication capacity. Cellular network operators often respond to such demand spikes by deploying additional capacity specifically for high profile event locations and temporary capacity using cells on wheels (COWs) or portable base stations. Despite these extraordinary efforts, the extreme demand level at crowded events still causes connection failure rates as high as 400 times more than normal as well as significantly higher latency and packet loss for end-user applications.

DETAILED DESCRIPTION

Figure 1:
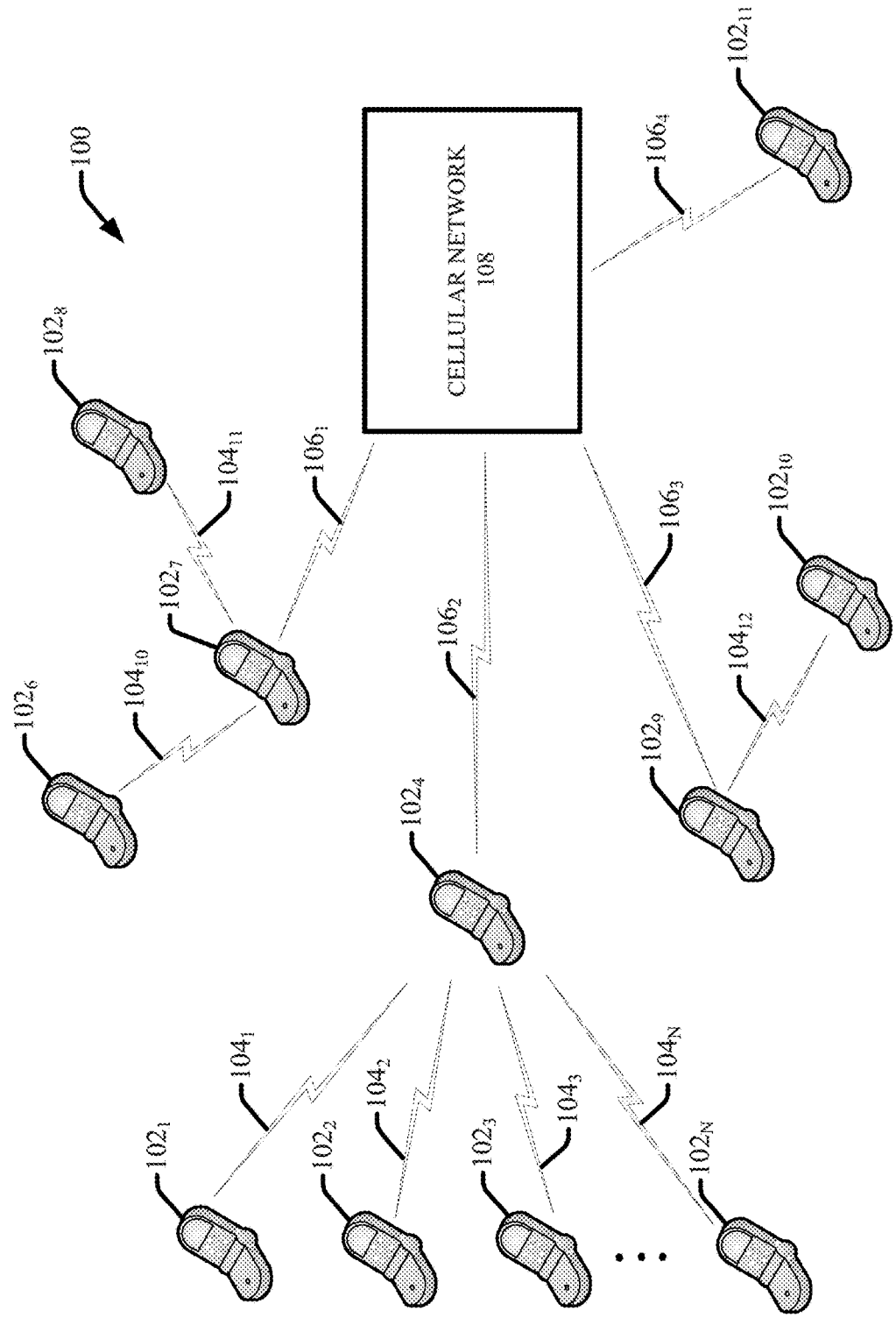
FIG. 1 illustrates an example of a schematic wireless network system that facilitates sharing cellular data connections in accordance with various aspects and embodiments described herein.

The various embodiments are described with reference to the drawings, wherein like reference numerals are used to refer to like elements throughout. In the following description, for purposes of explanation, numerous specific details are set forth in order to provide a thorough understanding of the various embodiments. It may be evident, however, that the various embodiments can be practiced without these specific details. In other instances, well-known structures and components are shown in block diagram form in order to facilitate describing the various embodiments.

By way of introduction, the disclosed subject matter provides an opportunistic cellular network connection sharing scheme that reduces the cellular network load, particularly during crowded events. As previously noted, cellular networks are often overloaded during crowded events, such as concerts or sporting events, resulting in various network performance issues. Among these network performance issues, data connection failures have been found to increase significantly. Data connection failures occur when too many user devices (also referred to herein as user equipments (UEs)) attempt to acquire radio resources at the same time, exhausting the limited bandwidth of the signaling channel.

To mitigate the impact of network performance issues during crowded events, an opportunistic connection sharing scheme among UEs is provided that mitigates connection failures by aggregating traffic from multiple UEs into a single cellular connection. The connection sharing scheme involves having devices that have successfully established direct data connections with the cellular network open up their connections for sharing with other devices in their vicinity. Accordingly, some of the UEs present at a crowded event can act as cellular network access points for other UEs in their vicinity. The nearby devices can communicate with the devices serving as cellular network access points over local wireless network technologies such as wireless fidelity (WiFi) or Bluetooth™. The devices serving as cellular network access points can then relay data between the cellular network and the devices locally connected to the devices serving as cellular network access points.

By having some devices share their cellular data connection with nearby devices, opportunistic connection sharing reduces the number of overall cellular data connection requests, hence avoiding the overhead spent on establishing such connections and tearing down such connections after idle time-outs. In addition, by having some devices share their cellular connection with nearby devices over their existing WiFi or Bluetooth™ interfaces, the subject cellular connection sharing scheme does not require architectural changes to network protocols and hardware.

In an aspect, a UE can be configured to first attempt to connect to the cellular network via a nearby device serving as a cellular network access point device prior to attempting to connect to the cellular network directly. If such a nearby device is not available, the UE can then directly connect to the cellular network. After establishing a connection to the cellular network, the UE can also open up its cellular connection to nearby devices and serve as a cellular network access point.

In another aspect, the cellular network can mediate selection of a subset of UEs present at a crowded event to serve as cellular network access points. According to this aspect, the cellular network can assign devices as cellular network access points based on a variety of factors, such as battery life, signal strength, location and network congestion. User devices serving as cellular network access points for other devices can experience high energy drain and may run out of battery power. To cater for this issue, the devices that serve as access points can periodically rotate among the pool of devices located at the crowded event, as direct by the cellular network. The cellular network can also favor selection of user devices with better signal strength than others because UEs consume significantly more energy and suffer reduced effective bit rate when the signal strength is poor. In an aspect, the cellular network can provide billing based incentives to users for participating in an opportunistic cellular connection sharing scheme.

In one embodiment, a device is provided having a memory to store executable instructions and a processor, coupled to the memory, that facilitates execution of the executable instructions to perform various operations. The operations include scanning an area for another device that has established a first wireless cellular connection with a cellular network device of a cellular network and that enables an indirect connection of the device to the cellular network device via a direct connection of the device to the other device via a local network device. The operations further include, in response to identifying the other device as a result of the scanning, sending a request to the other device to connect to the other device via the local network device and to receive the indirect connection to the cellular network device.

In another embodiment a method includes, scanning, by a first device comprising a processor, an area for a second device that has established a first wireless cellular connection with a cellular network device of a cellular network and that enables an indirect connection of the first device to the cellular network device via a direct connection of the first device to the second device via a local network device. In response to identifying the second device as a result of the scanning, the method further includes, sending, by the first device, a request to the second device to connect to the second device via the local network device and to receive the indirect connection to the cellular network device.

In yet another embodiment, disclosed is a tangible computer readable medium comprising computer executable instructions that, in response to execution, cause a system to perform various operations. These operations can include, establishing a wireless cellular connection with a cellular network device, enabling indirect connections of other devices to the cellular network device via direct connections of the other devices to the device via a network device of a local network, and transmitting information indicating that the device is able to facilitate the indirect connections with the cellular network device.

With reference to the drawings, FIG. 1 is an example system that facilitates cellular connection sharing in accordance with various aspects and embodiments described herein. Aspects of systems, apparatuses or processes explained in this disclosure can constitute machine-executable components embodied within machine(s), e.g., embodied in one or more computer readable mediums (or media) associated with one or more machines. Such components, when executed by the one or more machines, e.g., computer(s), computing device(s), virtual machine(s), etc. can cause the machine(s) to perform the operations described.

System 100 includes a plurality of UEs $102_{1-N}$ connected to a cellular network 108. Some of the UEs (e.g., UEs $102_7$, $102_4$, $102_9$, and $102_{11}$) are directly connected to the cellular network 108 via direct cellular data connections 106 (e.g., connections $106_1$, $106_2$, $106_3$ and $106_4$, respectively) and some of the UEs are indirectly connected to the cellular network 108 via local network connections $104_{1-N}$ to a UE that is directly connected to the cellular network 108. The UEs (e.g., UEs $102_7$, $102_4$, $102_9$, and $102_{11}$) that are directly connected to the cellular network 108 via direct cellular data connections 106 are configured to serve as cellular network access points through which other devices can indirectly connect to the cellular network 108. In particular, when a UE is serving as a cellular network access point, the UE can relay information between a device connected thereto and the cellular network 108. In an aspect, respective UEs 102 can rotate serving as cellular network access points.

The local connections 104 via which the other devices respectively connect to the devices serving as access points (e.g., UEs $102_7$, $102_4$, $102_9$, and $102_{11}$) can include short range radio frequency connections (e.g., up to about 20 meters). For example, a UE (e.g., UE $102_4$) serving as a cellular network access point can employ WiFi technology and serve as a WiFi access point. In another example, a UE serving as a cellular network access point can connect to other nearby devices using other types of wireless peer-to-peer communication technology (e.g., Bluetooth™ technology or near field communication (NFC)). Two or more UEs 102 connected to one another establishes a local area network (LAN).

System 100 can be employed in crowded environments, where a plurality of users and are gathered with their respective UEs (e.g., sporting events or concerts), to reduce cellular network performance errors attributed to a surge in communication demands associated with usage of the respective UEs. For example, during crowded events such as concerts or sporting events, cellular data usage is characterized by high upstream to downstream volume ratio and high error rates during network resource allocation operations observed from the radio access network (RAN). The high resource allocation error rate is mainly due to surge in usage demand as the result of high concentration of user population in small geological area and high concentration of communication demands within short communication windows (typically triggered by specific event activities, such as a touchdown during a football game).

In addition, during crowded events, cellular data usage is also characterized by short connection duration. For example, during sporting events or concerts, users tend to use their cellular devices to send short messages or post comments and pictures at social networking sites, and then return their focus back to the actual event as opposed to using their cellular device continuously. However, each cellular data connection takes time and radio resources to set up, regardless of the duration of connection time. When establishing a cellular data connection, the cellular device requests network recourses and the radio access network (RAN) takes time to plan and assign the resources. Further, after a cellular device finishes sending its data, its cellular data connection will be timed out after certain amount of idle (no data) time and the associated radio resources are released for other user devices. However, during the idle time, the radio resources remain allocated to the cellular data connection and cannot be reallocated for other purposes. These are all examples of overheads associated with connection set-up and tear-down. Radio resources used for such purposes cannot be used for sending user data.

System 100 reduces the number of direct connections 106 between UEs and the cellular network 108. As a result, data connection failures associated with too many UEs attempting to acquire radio resources at the same time are reduced. In addition, the overhead spent on establishing such direct connections 106 and tearing down such connections after idle time-outs, is minimized. Accordingly, more radio resources are made available for sending user data.

It should be appreciated that the number of UEs depicted in system 100 are merely exemplary. System 100 can be adapted to accommodate any number M UEs. Further, the number of devices a UE serving as a cellular network access point can accommodate at a time can include any number N devices. In an aspect, the number of the UEs serving as cellular network access points can vary based on network congestion, device capability, and user authorization associated with participation in a cellular connection sharing scheme.

Cellular network 108 can employ various cellular technologies. For example, cellular network 108 can operate in accordance with a universal mobile telecommunications system (UMTS), long term evolution (LTE), high speed packet access (HSPA), code division multiple access (CDMA), time division multiple access (TDMA), frequency division multiple access (FDMA), multi-carrier code division multiple access (MC-CDMA), single-carrier code division multiple access (SC-CDMA), orthogonal frequency division multiple access (OFDMA), single-carrier FDMA (SC-FDMA), 3rd and 4th generation partnership project (3GPP and 4GPP), etc.

Figure 2:
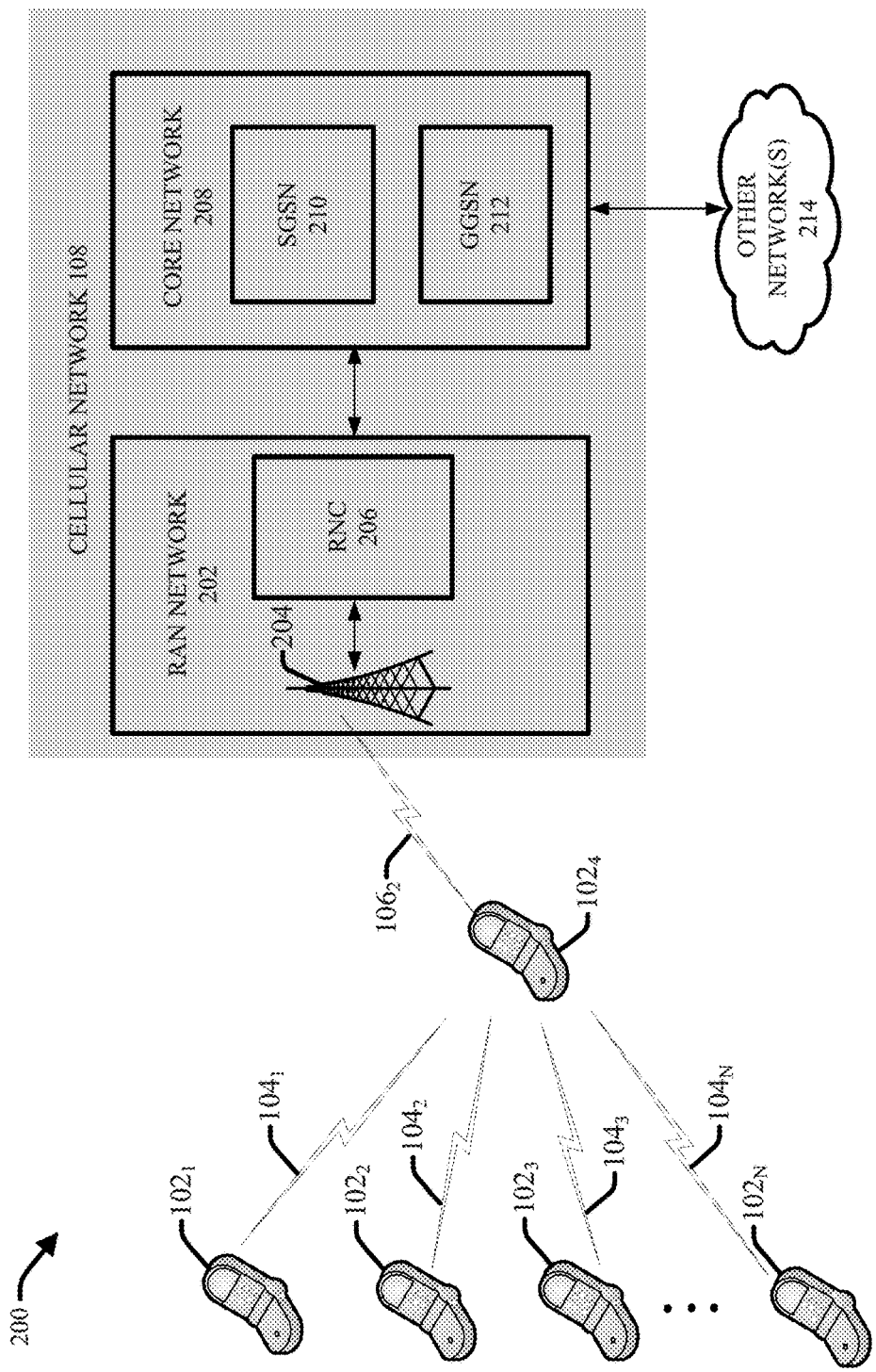
FIG. 2 illustrates another example of a schematic wireless network system that facilitates sharing cellular data connections in accordance with various aspects and embodiments described herein.

Referring now to FIG. 2, presented is another example system 200 that facilitates cellular connection sharing in accordance with aspects and embodiments described herein. System 200 includes same or similar features presented in system 100. Repetitive description of like elements employed in respective embodiments of systems, processes and devices described herein are omitted for sake of brevity.

System 200 demonstrates an example architecture of cellular network 108 in accordance with aspects and embodiments described herein. In an aspect, cellular network 108 is a 3GPP cellular network. Cellular network 108 includes two major components, radio access network (RAN) 202 and core network (CN) 208. RAN 202 includes one or more NodeBs (eNBs) 204 and radio network controllers (RNCs) 206. In an aspect, each eNB 204 has multiple antennas, where each antenna corresponds to a different cell sector. CN 208 includes one or more serving general packet radio support (GPRS) nodes (SGSN) facing the user device and one or more gateway GPRS nodes (GGSNs) facing other external networks (e.g., the Internet). UE $102_4$ connects to one or more cell sectors in the RAN 202. The traffic generated by UE $102_4$ is sent to the corresponding eNB 204. RNC 206 controls and exchanges traffic with eNB 204. RNCs (e.g., RNC 206) manage control signaling such as radio access bearer (RAB) assignments, transmission scheduling, and handovers. RNCs send traffic from eNBs (e.g., eNB 204) to SGSNs 210, which then send it to GGSNs 212. GGSNs 212 eventually send traffic to external networks 214, such as the Internet.

RAN 202 dynamically allocates resources to a UE attempting to connect to cellular network 108. Specifically, respective UEs attempting to connect to cellular network 108 negotiate allocation of radio resources with the RAN based on a wide range of factors, such as available radio resources and signal strength. Respective UEs follow the radio resource control (RRC) protocol for dynamic acquisition and dropping of radio resources. According to RRC protocol, a UE transitions to dedicated channel (DCH) state or forward access channel (FACH) state for uplink or downlink data transfer. The RAN 202 assigns a dedicated or shared channel for DCH and FACH states, respectively. If a UE does not have any data to transfer, it transitions to paging channel (PCH) state before transition to an idle (IDLE) state.

Communication between a UE (e.g., UE $102_4$) and cellular network 108 can be divided into two phases, pre-connection and post-connection. The pre-connection phase is characterized by the UE attempting to establish a data connection with the cellular network 108 for it to send and receive data, or in other words establishing a RAB. In this phase the user device waits for connection, while not being able to exchange data at all. The post-connection phase starts after a RAB is assigned. In this phase user experience is related to more traditional Internet end-to-end performance metrics, such as TCP delay and packet loss.

During the RAB setup phase, the RNC verifies that the radio resource necessary to service the actually exists before it assigns a RAB. In other words, if a UE has successfully acquired a RAB for it to conduct data communication, its performance will likely remain acceptable per operator's configuration even if the overall network demand level exceeds network capacity. This is because excessive demand requests would be blocked off by the RNC from acquiring any RAB and conducting data communication. Thus, at a crowded event where demand surges exceed cellular network 108 capacity, the primary reason for poor user experiences is attributed to an inability to establish a data connection.

Figure 3:
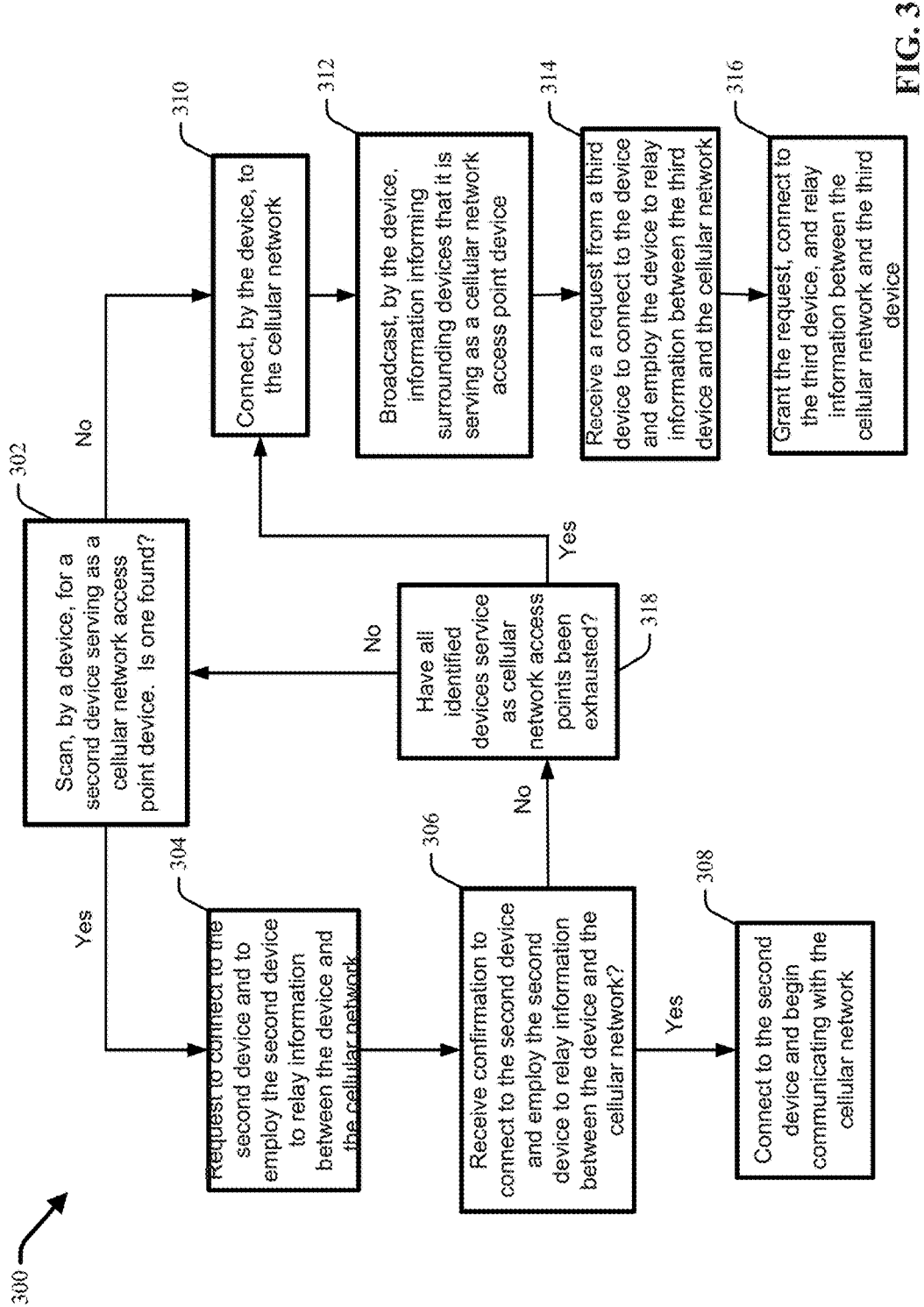
FIG. 3 illustrates an example flow diagram of a process for sharing cellular data connections in accordance with various aspects and embodiments described herein.

FIG. 3 is a flow diagram of an example process 300 for sharing cellular connections in accordance with aspects and embodiments described herein. Repetitive description of like elements employed in respective embodiments of systems, processes and devices described herein are omitted for sake of brevity.

Process 300 is particularly useful in crowded environments where there exists a high demand for communication capacity within a cellular network. At 302, a device (e.g., a UE) can scan for a second device within its vicinity that is serving as a cellular network access point. For example, the device can employ existing WiFi or Bluetooth™ discovery protocol to identify other devices within its vicinity that are serving as cellular network access points. If the device identifies a second device serving as a cellular network access point, at 304 the device can request to connect to the second device and to employ the second device to relay information to and from the cellular network. Otherwise, process 300 continues to step 310 where the device attempts to connect to the cellular network directly. In an aspect, as a result of scanning, the device could identify two or more other devices serving as cellular network access points. In this scenario, the device can select the access point device providing the strongest radio signal.

At 306, in response to the request, the device will either receive confirmation to connect to the second device and to employ the second device to relay information between the device and the cellular network (e.g., via a local network established between the device and the second device upon connection of the device to the second device) or receive a message denying its request. If the request is confirmed, process 300 continues to step where the device will connect to the second device and begin communicating with the cellular network using the second device to relay information to and from the device and the cellular network. In the event the request is denied, process 300 continues to step 318. For example, the request may be denied because a load capacity of the second device cannot accommodate the device (e.g., the second device is serving too many other devices). In another example, the request may be denied because the power level of the second device is too low to accommodate battery draw associated with serving the device. In yet another example, the request may be denied because the signal strength associated with the cellular data connection between the second device and the cellular network has weakened (e.g., as a result of movement of the second device) or has otherwise diminished.

At 318, if more than one device was initially identified at step 302, process 300 repeats steps 302-306 until all other devices identified as cellular network access points devices have been exhausted. If only one device was initially identified at step 302 or all other device identified as cellular network access points devices have been exhausted, process 300 continues to step 310, where the device attempts to connect to the cellular network directly.

At 310, after the device has connected to the cellular network directly, the device can elect to serve as a cellular network access point device for other surrounding devices. At 312, the device can transmit or broadcast information informing nearby devices that it is serving as a cellular network access point device. For example, the device can periodically send out a beacon with information identifying itself as a cellular network access point device. At 314, the device receives a request from a third device to employ the device to relay information to and from the cellular network. At 316, the device can grant the request, connect to the third device, and relay information between the cellular network and the third device.

Process 300 is a dynamic process where UEs in a crowded environment can continuously change roles from serving as a cellular access points for other devices to employing other devices serving as a cellular access point. Whether a device is serving as an access point at any point in time will depend in part on the number of other devices serving as access points within its vicinity and cellular network congestion. As discussed infra, in an aspect, the cellular network can facilitate assigning and rotating the role of "cellular network access point" amongst a plurality of devices located at a crowded environment to limit battery draw associated with the role of cellular network access point.

Figure 4:
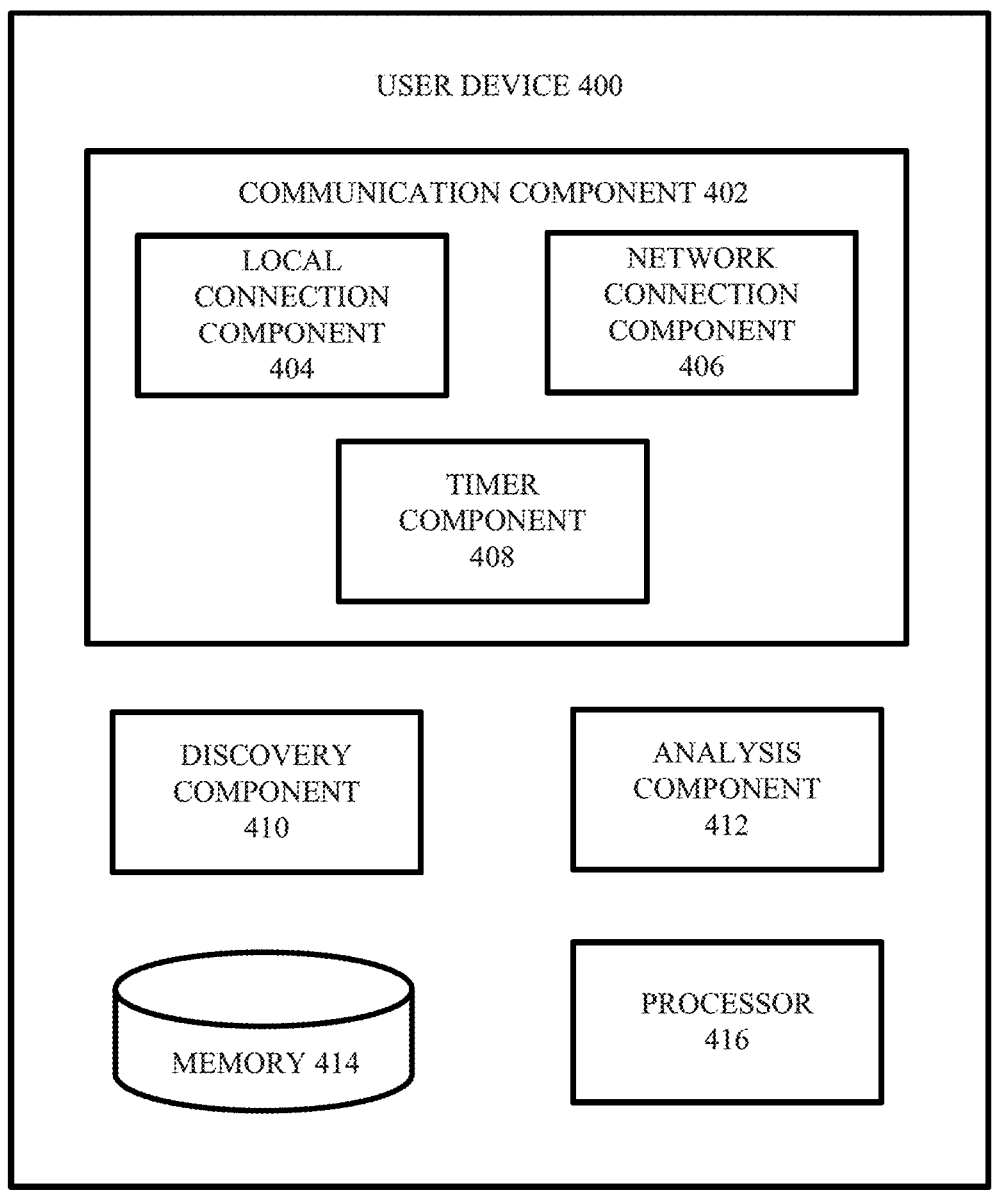
FIG. 4 presents a diagram of an example user device that facilitates sharing cellular data connections in accordance with various aspects and embodiments described herein.

FIG. 4 presents an example user device 400 that facilitates cellular connection sharing in accordance with aspects and embodiments described herein. Repetitive description of like elements employed in respective embodiments of systems, processes and devices described herein are omitted for sake of brevity.

User device 400 can include any suitable communication device configured to communicate with a cellular network (e.g., cellular network 108) and/or another device via a LAN. For example, user device 400 can include a phone, a smartphone, a laptop computer, a tablet personal computer (PC), or a personal digital assistant PDA. User device 400 includes communication component 402, discovery component 410 and analysis component 412. User device 400 further includes memory 414 for storing computer executable components and instructions and processor 416 to facilitate operation of the instructions (e.g., computer executable components and instructions) by user device 400.

Discovery component 410 is configured to scan for and identify one or more devices that have established data connections with a cellular network (e.g., cellular network 108) and that are serving as cellular network access points. As previously noted, a device that serves as a cellular network access point includes a device that has established a cellular data connection with the cellular network and that has opened up its cellular data connection to other devices by allowing the other devices to connect to it via a local network (e.g., using WiFi, Bluetooth™, NFC, and the like). The device serving as the cellular network access point further relays data between a device connected thereto and the cellular network.

Discovery component 410 can employ various existing or potential discovery protocol associated with identifying a LAN or personal area network (PAN) in order to identify a device serving as a cellular network access point. In an aspect, discovery component 410 can activate a WiFi and/or Bluetooth™ transceiver of device 400 to scan for and identify one or more other devices emitting WiFi and/or Bluetooth™ signals indicating their respective identities as a cellular network access point devices. The signals can also include information indicating signal strengths of the cellular connections of the respective devices, information indicating connection parameters for connecting to the respective devices, and/or information regarding their respective ability to service cellular data communications for device 400 (e.g., based on load capacity or battery level of the respective devices). Discovery component 410 can also determine strengths of signals received from the respective devices.

In another example, discovery component 410 can send out a request beacon requesting any surrounding devices that are serving as cellular network access points to respond and identify themselves. The request beacon can include request the surrounding devices to provide information regarding signal strengths of the cellular connections of the respective devices, information indicating connection parameters for connecting to the respective devices, and/or information regarding their respective ability to service cellular data communications for device 400 (e.g., based on load capacity or battery level of the respective devices). Discovery component 410 can receive and process responses to the request beacon containing the information requested. Discovery component 410 can also determine strengths of signals received from the respective devices in response to the response beacon.

Communication component 402 is configured to connect device 400 to various networks and/or devices and communicate information between device 400 and the various networks and devices. Communication component 402 includes local connection component 404 to facilitate connecting user device 400 to a local network or another device via the local network. For example, local connection component 404 can facilitate connecting device 400 to a device, identified by discovery component 410, that is serving as a cellular network access point device. In an aspect, local connection component can employ existing WiFi technology, Bluetooth™, or the like, to connect to a device serving as a cellular network access point device. Bluetooth™ has lower power consumption, smaller radio range, and supports less data rate compared to WiFi. Consequently, it can be used as a low power alternative for small transmissions (such as tweets).

In an aspect, in response to identification of a device serving as a cellular network access point device by discovery component 410, local connection component 404 can send a request to the device requesting to connect to the device and to employ the device to relay information between the device 400 and the cellular network. Local connection component 404 is further configured to receive responses from such a connection request affirming or denying the request. As noted supra, the request may be denied for various reasons, including but not limited to, a load of the device serving as the cellular network access point, a battery level of the device serving as the cellular network access point, or strength of the cellular data connection between the device serving as the cellular network access point and the cellular network. If the request is affirmed, local connection component 404 can facilitate connection of device 400 to the device serving as the cellular network access point device and begin communicating with the device serving as the cellular network access point device. In particular, local connection component 404 can instruct the device serving as the cellular network access point device to relay information between device 400 and the cellular network.

In an aspect, when discovery component 410 identifies two or more devices serving as cellular network access point devices, local connection component 404 can employ analysis component 412 to determine which of the two or more devices is best suited to service cellular data communications for device 400. Local connection component 404 can then connect or attempt to connect to the best suited device. If connection is denied, local connection component 404 can proceed to attempt to connect to the second best suited device, then the third best suited device, and so on.

According to this aspect, analysis component 412 can analyze information related to signal strengths associated with the cellular connections established between the respective devices serving as cellular network access points and the cellular network, strengths of signals received from the respective devices, current loads and load capacity of the respective devices and/or battery level of the respective devices, to determine which of the devices are best suited to service cellular data communications for device 400. Analysis component 412 can employ various algorithms stored in memory 414 that apply weighted values to the various parameters listed above in order to identify a device that is best suited to service cellular data communications for device 400. For example, when comparing two devices serving as potential cellular network access points for device 400, analysis component 412 can select the device associated with the highest cellular connection signal strength, the highest strength of signals received from the device by device 400, the lowest load and highest load capacity, and the highest battery level.

Network connection component 406 is configured to facilitate direct connection of device 400 to a cellular network (e.g., cellular network 108) using existing and/or potential cellular connection technologies. In an aspect, network connection component 406 is configured to initiate direct connection of device 400 to a cellular network in response to an inability of local connection component 404 to connect to another device serving a cellular network access point. In another aspect, network connection component 406 is configured to initiate direct connection of device 400 to a cellular network prior to attempting to connect to another device serving as a cellular network access point device. According to this aspect, local connection component 404 can be configured to initiate connection of device 400 to a device serving as a cellular network access point in response to an inability of device 400 to establish a direct connection to the cellular network.

Timer component 408 is configured to direct local connection component 404 and/or network connection component 406 to disconnect device 400 from a local network or a cellular network, respectively, after a predetermined window of idle time has passed. In particular, after a cellular device (e.g., device 400) finishes sending or receiving data to and from the cellular network via a direct cellular data connection to the cellular network, it disconnects from the cellular network after a predetermined amount of inactivity time (no data) expires so that radio resources can be reallocated by the RAN for other purposes. Timer component 408 is configured to monitor times of inactivity (e.g., where no data is sent or received) by device 400 following a transmission or receipt of data directed to the cellular network or received by the cellular network, respectively. After a predetermined amount of inactivity or idle time has passed, timer component 408 can direct device 400 to disconnect from the network or device employed to communicate with the cellular network.

For example, when device 400 is indirectly connected to the cellular network via a device serving as a cellular network access point, timer component 408 can monitor times of inactivity following a data communication relayed between device 400 and the device serving as the cellular network access point. After the time of inactivity reaches a first threshold time, timer component 408 can direct local connection component 404 to disconnect device 400 from the device serving as the cellular network access point. Similarly, when device 400 is directly connected to the cellular network, timer component 408 can monitor times of inactivity following a data communication between device 400 and the cellular. After the time of inactivity reaches a second threshold time, timer component 408 can direct network connection component 406 to disconnect device 400 from the cellular network. In an aspect, the first threshold time is longer than the second threshold time. For example, the first threshold time can be one minute while the second threshold time can be thirty seconds. In another example, the first threshold time can be 25% longer than the second threshold time. In another example, the first threshold time can be 50% longer than the second threshold time. In yet another example, the first threshold time can be 70% longer than the second threshold time.

Figure 5:
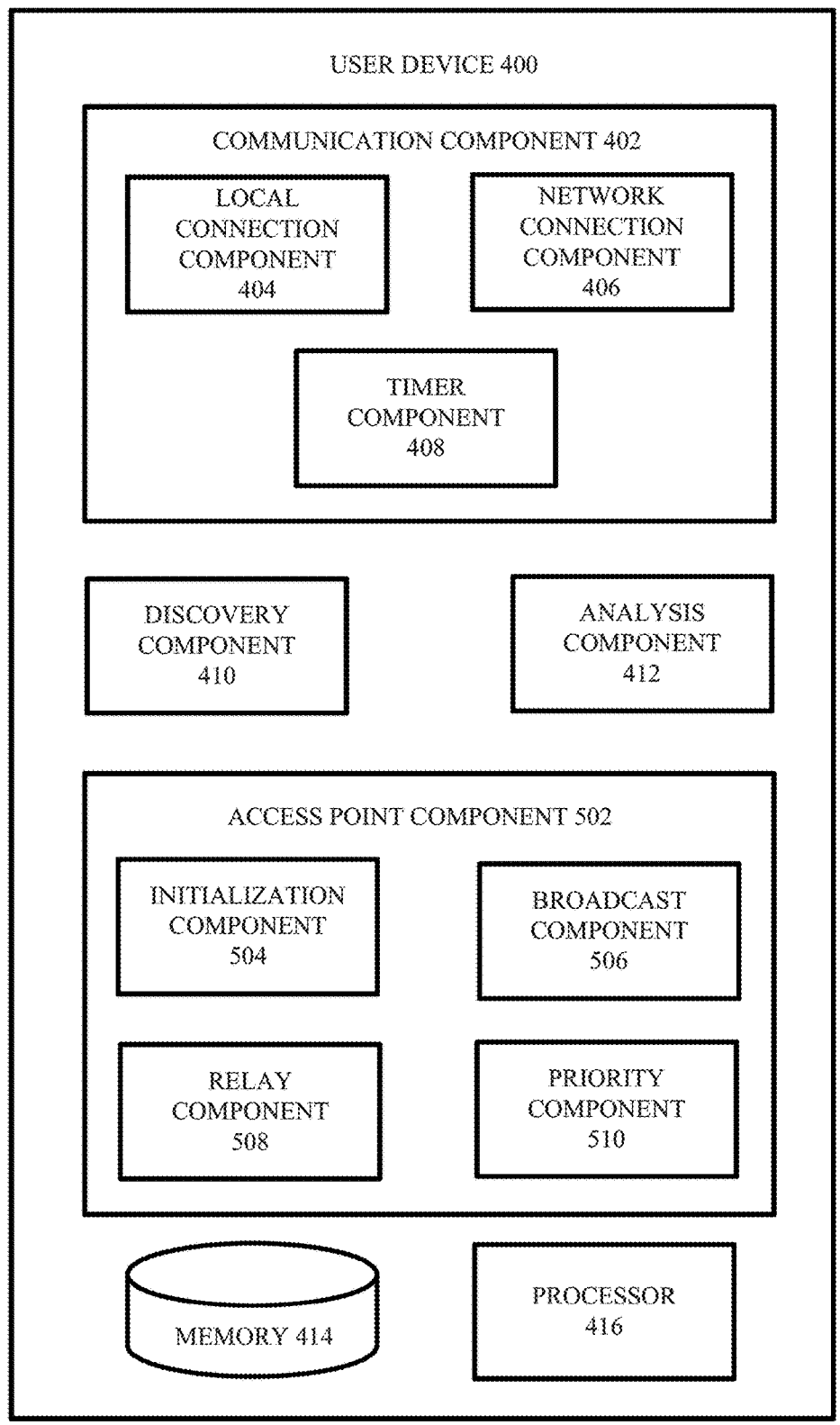
FIG. 5 presents a diagram of an example user device that facilitates sharing cellular data connections in accordance with various aspects and embodiments described herein.

FIG. 5 presents another example user device 500 that facilitates cellular connection sharing in accordance with aspects and embodiments described herein. User device 500 includes same or similar components presented with device 400. Repetitive description of like elements employed in respective embodiments of systems, processes and devices described herein are omitted for sake of brevity.

In addition to the various components presented with device 400, user device 500 includes access point component 502 that provides functionality for device 500 to serve as a cellular network access point. Accordingly, device 500 can both employ another device serving as a cellular network access point and become a cellular network access point. In an aspect, a user of device 500 can control how device 500 operates with respect to serving as a cellular network access point or not. For example, a user of device 500 can choose to (or choose not to) initialize device 500 as a cellular network access point device and open up its cellular data connection to other devices. In an aspect, a user can be provided various incentives (e.g., billing incentives, increased data plan incentives, etc.) to enable his or her device as a cellular network access point device. In an aspect, a cellular connection scheme can require users to allow their devices to be employed as cellular network access point devices (when needed) in order to reap the benefits of employing other user's devices as cellular network access point devices. In other words, device 500 cannot connect to another device serving as a cellular network access point device unless a user of device 500 has authorized/enabled device 500 to become a cellular network access point.

In another aspect, device 500 can automatically switch in and out of the role of a cellular network access point depending on cellular network conditions (e.g., network load as associated with a crowded event). For example, in an aspect, when local connection component 404 cannot establish an indirect connection to the cellular network via another device serving as a cellular network access point, network connection component 406 can establish a direct cellular data connection with the cellular network. At this time, device 500 can elect to or automatically become a cellular network access point for other devices. According to this aspect, the user of device 500 can have previously authorized device 500 to automatically be enabled as a cellular network access point device. Still in other aspects, discussed infra, the cellular network can facilitate and/or control when and how long device 500 serves as a cellular network access point.

Access point component 502 includes initialization component 504, broadcast component 506, relay component 508 and priority component 510. Initialization component 504 is configured to activate and deactivate cellular network access point functionality of device 500. In an aspect, in response to a determination that device 500 has established a direct data connection with a cellular network (e.g., cellular network 108), initialization component 504 can employ local connection component to activate cellular network access point functionality of device 500 and set up a LAN for device 500 via which other devices can connect to device 500. For example, local connection component 404 can activate a radio transceiver of device 500 (e.g., a WiFi transceiver, a Bluetooth™ transceiver, etc.) and allow other devices to connect to device 500.

In an aspect, upon activation of device 500 as a cellular network access point, broadcast component 506 can broadcast or transmit information (e.g., periodically send out a beacon) identifying device 500 as a cellular network access point device. Broadcast component 506 can also broadcast or transmit information indicating the strength of its cellular connection with the cellular network, information indicating connection parameters for connecting to device 500 via the LAN or in a peer to peer fashion, and/or other information regarding the ability of device 500 to service cellular data communications for another device (e.g., a current load of device 500 or a power level of device 500).

In an aspect, initialization component 504 can employ analysis component 412 to determine whether or not device 500 is suitable for serving as a cellular network access point prior to initializing device 500 as a cellular network access point. According to this aspect, analysis component 412 can analyze factors such as power level of device 500, a load of device 500, strength of the cellular data connection between device 500 and the cellular network, and/or a location of device 500 (e.g., as determined via various known or potential mobile device locating mechanisms, such as via a global positioning system (GPS), assisted GPS, triangulation, time distance of arrival methods, TDOA, etc.). In an aspect, based on a determination by analysis component that device 500 is suitable for serving as a cellular network access point, initialization component 504 can initialize device 500 as a cellular network access point. In one aspect, analysis component 412 can analyze whether device 500 is suitable to serve as a cellular network access point prior to connection of device 500 to the cellular network. According to this aspect, in response to a determination that device 500 is a good candidate to serve as a cellular network access point, initialization component 504 can direct network connection component 406 to connect device 500 to the cellular network directly. After a direct cellular data connection is established, initialization component 504 can then initialize device 500 as a cellular network access point.

In a similar respect, analysis component 412 can determine when device 500 has become unsuitable as a cellular network access point based on a power level of device 500, a load of device 500, strength of the cellular data connection between device 500 and the cellular network, and/or a location of device 500. Upon a determination that device 500 has become an unsuitable cellular network access point device, initialization component 504 can automatically deactivate device 500 as a cellular network access point device. In another aspect, initialization component 504 can be configured to automatically deactivate device 500 as a cellular network access point device after device 500 has served as a cellular network access point device for a predetermined period of time, regardless as to whether its ability to continue serving as a good cellular network access point has diminished.

After device 500 has become activated as a cellular network access point device, device 500 can begin servicing cellular data communications for other devices within its vicinity. For example, access point component 502 can receive requests from other devices to connect to device 500 via the LAN and to employ device 500 to relay information between the other devices, respectively, and the cellular network. Access point component 502 can process such request and manage connections between device 500 and other devices. In an aspect, access point component 502 can employ analysis component 412 to determine whether or not to grant such requests based on various factors, including but not limited to, a power level of device 500, a load of device 500, strength of the cellular data connection between device 500 and the cellular network, and/or a location of device 500. For example, in response to a request from another device to connect to device 500 and employ device 500 to relay data between the other device and the cellular network, analysis component can analyze a load of the device (e.g., how many other devices device 500 is servicing) in view of a battery level of device 500). Based on this analysis, analysis component 412 may determine that device 500 cannot accommodate the other device and deny its request. Access point component 502 can employ local connection component 404 to establish local connections between device 500 and another device via the LAN.

After access point component 502 has granted a request to service cellular communications for another device and the other device has connected to device 500 via the LAN, relay component 508 can relay data between the other device and the cellular network. In an aspect, access point component 502 can employ timer component 408 to facilitate disconnecting from another device connected thereto via the LAN after a predetermined period of inactivity time where no data is communicated between device 500 and the other device. For example, timer component 408 can monitor times of inactivity following a data communication relayed between device 500 and another device connected thereto. After the time of inactivity reaches a threshold time, timer component 408 can direct local connection component 404 to disconnect device 500 from the other device. In an aspect, the threshold time for disconnecting device 500 from another device it is servicing via the LAN is set longer/higher than a corresponding inactivity threshold time employed by the cellular network (e.g., the RNC) to control when the cellular network disconnects from device 500.

Priority component 510 is configured to manage data communications between device 500 and a cellular network by providing priority to data communication originating from device 500. According to this aspect, when device 500 opens up its cellular data connection to other devices, priority component 510 can ensure that data communications originating from device 500 and targeted (e.g., from the cellular network) for device 500 are prioritized above communications associated with any devices device 500 is servicing.

Figure 6:
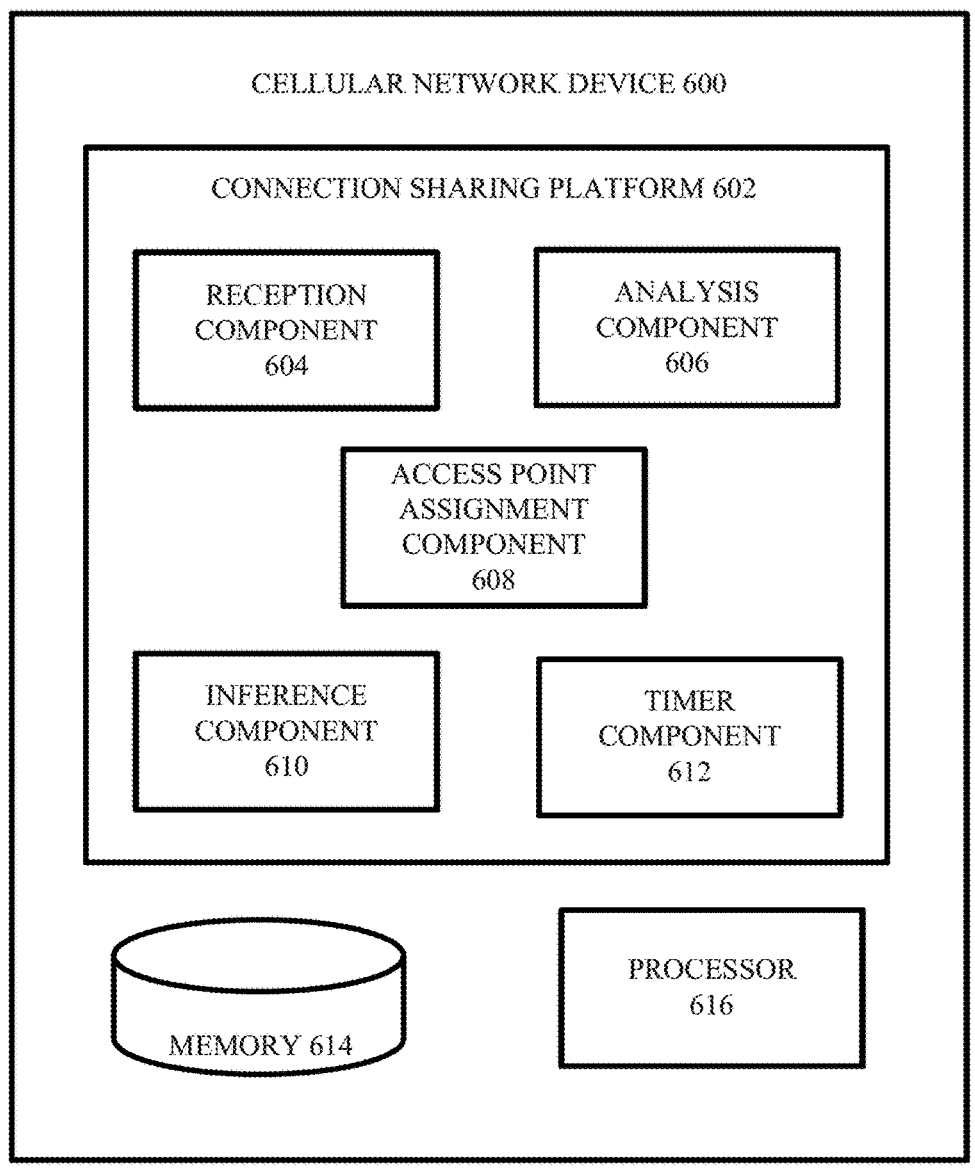
FIG. 6 presents a diagram of an example cellular network device that facilitates sharing cellular data connections in accordance with various aspects and embodiments described herein.

FIG. 6 presents an example cellular network device 600 that facilitates cellular connection sharing in accordance with aspects and embodiments described herein. Cellular network device 600 can represent one or more devices included in cellular network 108. For example, cellular network device 600 can include an RNC. Repetitive description of like elements employed in respective embodiments of systems, processes and devices described herein are omitted for sake of brevity.

Cellular network device 600 includes connection sharing platform 602 to facilitate cellular connection sharing in accordance with aspects and embodiments described herein. Cellular network device 600 includes memory 614 for storing computer executable components and instructions and processor 616 to facilitate operation of the instructions (e.g., computer executable components and instructions) by cellular network device 600.

Connection sharing platform 602 includes reception component 604, analysis component 606, access point assignment component 608, inference component 610 and timer component 612. Reception component 604 is configured to receive information regarding cellular network congestion associated with a specific geographic area and the cellular devices contributing to the cellular congestion in the geographic area. For example, reception component 604 can receive information regarding a number of cellular connection attempts and a number of successful connections among the connection attempts. In another example, reception component 604 can receive information regarding radio recourses available for servicing the devices included in the geographic area. Reception component 604 can also receive information indicating locations of respective devices throughout the geographic area, operating parameters of the respective devices (e.g., battery levels of the devices, signal strengths associated with respective data connections between the device and the cellular network, whether the respective devices are operating as access points, how long the respective devices have been operating as access points, loads of the respective devices when operating as access points, etc.), and whether user's of the respective device have authorized usage of their respective devices as cellular network access points.

Analysis component 606 is configured to analyze information received by the reception component to identify a subset of user devices present in the geographic to assign as cellular network access point devices. For example, analysis component 606 can analyze cellular network congestion information and the cellular devices contributing to the cellular network congestion (e.g., as gleaned from number of cellular connection attempts and a number of successful connections among the connection attempts), radio information regarding radio recourses available for servicing the geographic area, location information indicating locations of the respective devices, operating parameters of the respective device (e.g., as noted above), and whether user's of the respective device have authorized usage of their respective devices as cellular network access points.

Based on its analysis, analysis component 606 can determine a subset of the devices included in the geographic area to assign as cellular network access point devices (e.g., where the subset can include one or more devices). For example, devices acting as cellular network access points for others would experience high energy drain and may run out of battery power. To cater for this issue, the cellular network should prefer user devices with better signal strength because UEs consume significantly more energy and suffer reduced effective bit rate when the signal strength is poor. In an aspect, the analysis component 606 can dynamically determine new subsets of the devices based on changing conditions. For example, as network congestion increases, analysis component 606 can identify more devices to assign as cellular network access points and/or identify devices to revoke assignment as cellular network access points. It should be appreciated that the greater the cellular network congestion and associated network performance errors, the larger the subset of devices will be. Analysis component 606 can also facilitate rotating the role of "cellular network access point" amongst devices included in the geographic area based on the various factors noted above.

Access point assignment component 608 can communicate access point assignments and assignment revocations with the various devices included in the geographic area. For example, after analysis component 606 has identified a device to assign as a cellular network access point, access point assignment component 608 can send a message to the device directing the device to initialize as a cellular network access point. In an aspect, the message can indicate how long the device is to remain activated as a cellular network access point device. Similarly, after analysis component 606 has identified a device that is serving a cellular network access point device that the analysis component 606 has decided should no longer serve as a cellular network access point (e.g., based on power level, signal strength, location, a access point role rotation schedule, a reduction in network congestion, etc.), access point assignment component 608 can send a message to the device directing it to deactivate cellular network access point functionality.

In another aspect, analysis component 606 can employ inference component 610 to analyze data received by reception component 604 and infer one or more devices to assign as cellular network access point devices and/or revoke assignment as a cellular network access point device. In order to provide for or aid in such inferences, inference component 610 can examine the entirety or a subset of the data to which it is granted access and can provide for reasoning about or infer states of the system, environment, etc. from a set of observations as captured via events and/or data. An inference can be employed to identify a specific context or action, or can generate a probability distribution over states, for example. The inference can be probabilistic—that is, the computation of a probability distribution over states of interest based on a consideration of data and events. An inference can also refer to techniques employed for composing higher-level events from a set of events and/or data.

Such an inference can result in the construction of new events or actions from a set of observed events and/or stored event data, whether or not the events are correlated in close temporal proximity, and whether the events and data come from one or several event and data sources. Various classification (explicitly and/or implicitly trained) schemes and/or systems (e.g., support vector machines, neural networks, expert systems, Bayesian belief networks, fuzzy logic, data fusion engines, etc.) can be employed in connection with performing automatic and/or inferred action in connection with the claimed subject matter.

A classifier can map an input attribute vector, x=(x1, x2, x3, x4, xn), to a confidence that the input belongs to a class, such as by f(x)=confidence(class). Such classification can employ a probabilistic and/or statistical-based analysis (e.g., factoring into the analysis utilities and costs) to prognose or infer an action that a user desires to be automatically performed. A support vector machine (SVM) is an example of a classifier that can be employed. The SVM operates by finding a hyper-surface in the space of possible inputs, where the hyper-surface attempts to split the triggering criteria from the non-triggering events. Intuitively, this makes the classification correct for testing data that is near, but not identical to training data. Other directed and undirected model classification approaches include, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

As previously mentioned, after a cellular device finishes sending its data, its cellular data connection will be timed out after certain amount of idle (no data) time and the associated radio resources are released for other user devices. However, during the idle time, the radio resources remain allocated to the cellular data connection in standby mode in the even the cellular device reengages the cellular data connection to send and/or receive data. Timer component 612 is configured to adapt the threshold amount of idle time before a cellular data connection between a device serving as a cellular network access point and the cellular network, is timed out. In an aspect, timer component 612 is configured to increase the amount of idle time associated with a cellular data connection between a device serving as a cellular network access point and the cellular network when compared to a cellular data connection between a device not serving as a cellular network access point and the cellular network. In another aspect, the timer component 612 can increase the amount of idle time for a cellular data connection between a device serving as a cellular network access point and the cellular network based on the number of devices the device serving as the cellular network point is services (e.g. based on a load of the device as related to the number of devices connected thereto.

Figure 7:
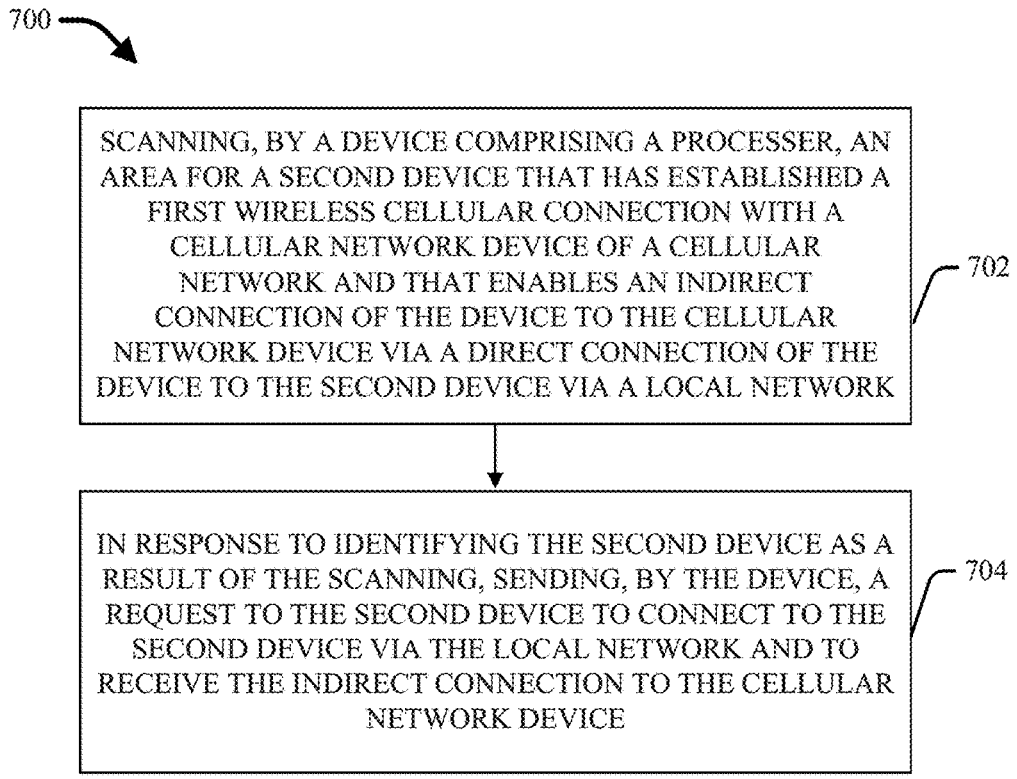
FIG. 7 illustrates an example method for sharing cellular data connections in accordance with various aspects and embodiments described herein.
Figure 8:
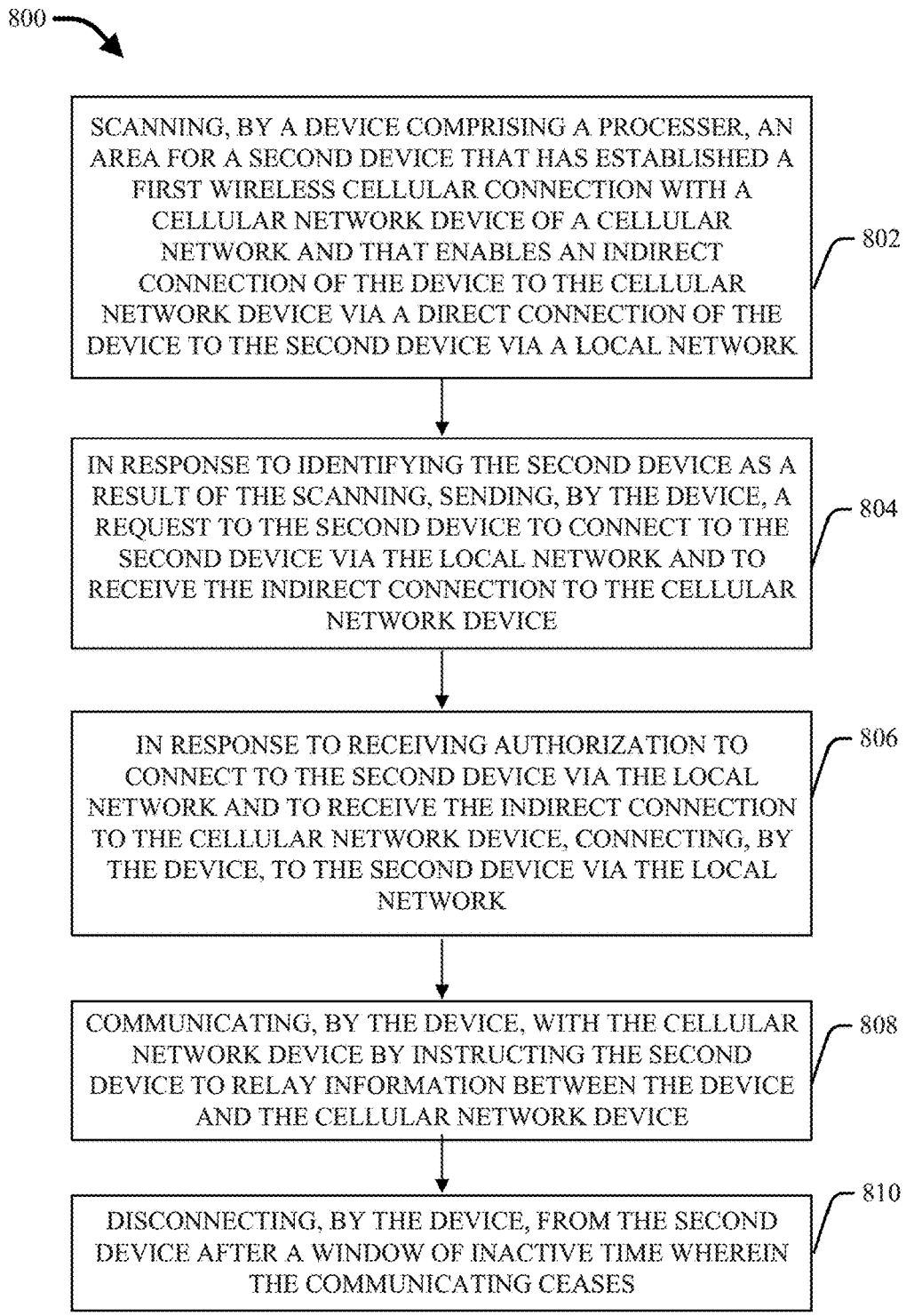
FIG. 8 illustrates another example method for sharing cellular data connections in accordance with various aspects and embodiments described herein.
Figure 9:
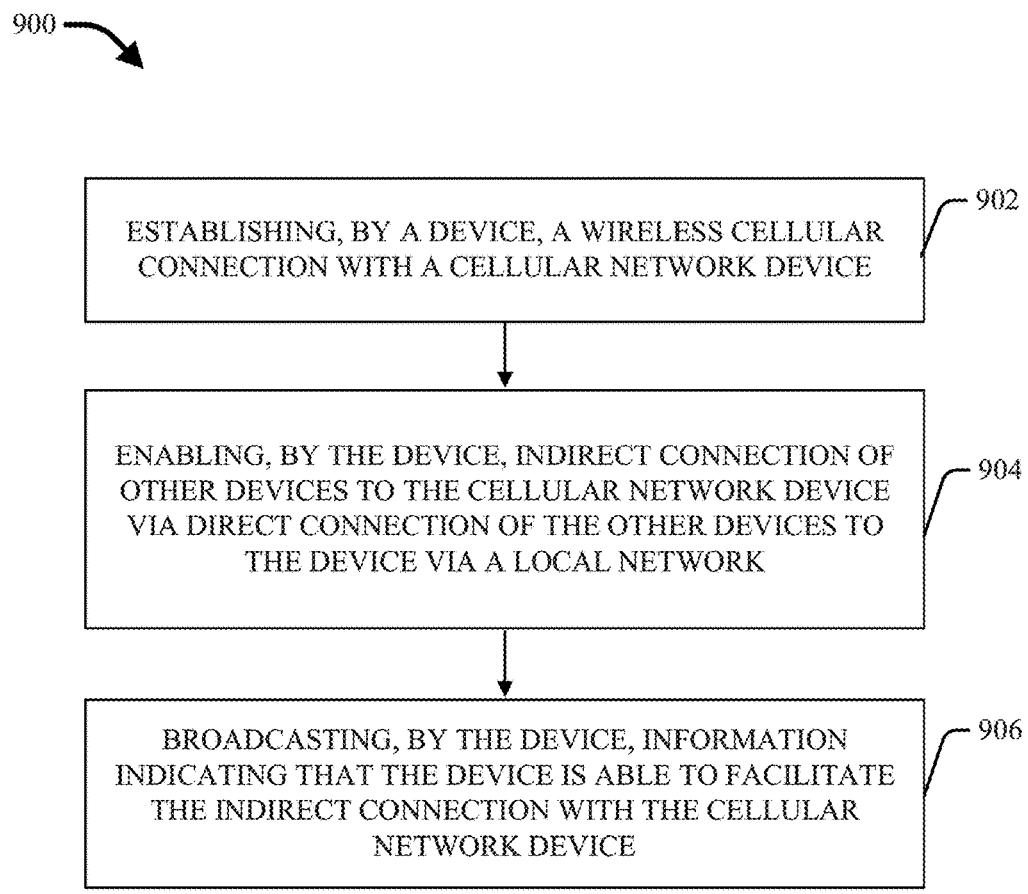
FIG. 9 illustrates another example method for sharing cellular data connections in accordance with various aspects and embodiments described herein.

In view of the example systems and/or devices described herein, example methods that can be implemented in accordance with the disclosed subject matter can be further appreciated with reference to flowcharts in FIGS. 7-9. For purposes of simplicity of explanation, example methods disclosed herein are presented and described as a series of acts; however, it is to be understood and appreciated that the disclosed subject matter is not limited by the order of acts, as some acts may occur in different orders and/or concurrently with other acts from that shown and described herein. For example, a method disclosed herein could alternatively be represented as a series of interrelated states or events, such as in a state diagram. Moreover, interaction diagram(s) may represent methods in accordance with the disclosed subject matter when disparate entities enact disparate portions of the methods. Furthermore, not all illustrated acts may be required to implement a method in accordance with the subject specification. It should be further appreciated that the methods disclosed throughout the subject specification are capable of being stored on an article of manufacture to facilitate transporting and transferring such methods to computers for execution by a processor or for storage in a memory.

FIG. 7 illustrates a flow chart of an example method for sharing cellular data connections in accordance with various aspects and embodiments disclosed herein. At 702 a device scans an area for a second device that has established a first wireless cellular connection with a cellular network device of a cellular network and that enables an indirect connection of the device to the cellular network device via a direct connection of the device to the second device via a local network. At 704, in response to identifying the second device as a result of the scanning, the device sends a request to the second device to connect to the second device via the local network and to receive the indirect connection to the cellular network device.

FIG. 8 illustrates a flow chart of another example method for sharing cellular data connections in accordance with various aspects and embodiments disclosed herein. At 802 a device scans an area for a second device that has established a first wireless cellular connection with a cellular network device of a cellular network and that enables an indirect connection of the device to the cellular network device via a direct connection of the device to the second device via a local network. At 804, in response to identifying the second device as a result of the scanning, the device sends a request to the second device to connect to the second device via the local network and to receive the indirect connection to the cellular network device. At 806, in response to receiving authorization to connect to the second device via the local network and to receive the indirect connection to the cellular network device, the device connects to the second device via the local network. At 808, the device then communicates with the cellular network device by instructing the second device to relay information between the device and the cellular network device. At 810, the device disconnects from the second device after a window of inactive time wherein the communicating ceases.

FIG. 9 illustrates a flow chart of another example method for sharing cellular data connections in accordance with various aspects and embodiments disclosed herein. At 902 a device (e.g., a mobile UE) establishes a wireless cellular connection with a cellular network device. At 904, the device enables indirect connection of other devices to the cellular network device via direct connection of the other devices to the device via a local network. At 906, the device broadcasts or transmits information indicating that the device is able to facilitate the indirect connection with the cellular network device The subject matter, FIGS. 10 and 11 as well as the following discussion are intended to provide a brief, general description of a suitable environment in which the various aspects of the disclosed subject matter may be implemented. While the subject matter has been described above in the general context of computer-executable instructions of a computer program that runs on a computer and/or computers, those skilled in the art will recognize that this disclosure also can or may be implemented in combination with other program modules. Generally, program modules include routines, programs, components, data structures, etc. that performs particular tasks and/or implement particular abstract data types. Moreover, those skilled in the art will appreciate that the inventive methods may be practiced with other computer system configurations, including single-processor or multiprocessor computer systems, mini-computing devices, mainframe computers, as well as personal computers, hand-held computing devices (e.g., smartphone, PDA, electronic tablets or pads, etc.), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

Figure 10:
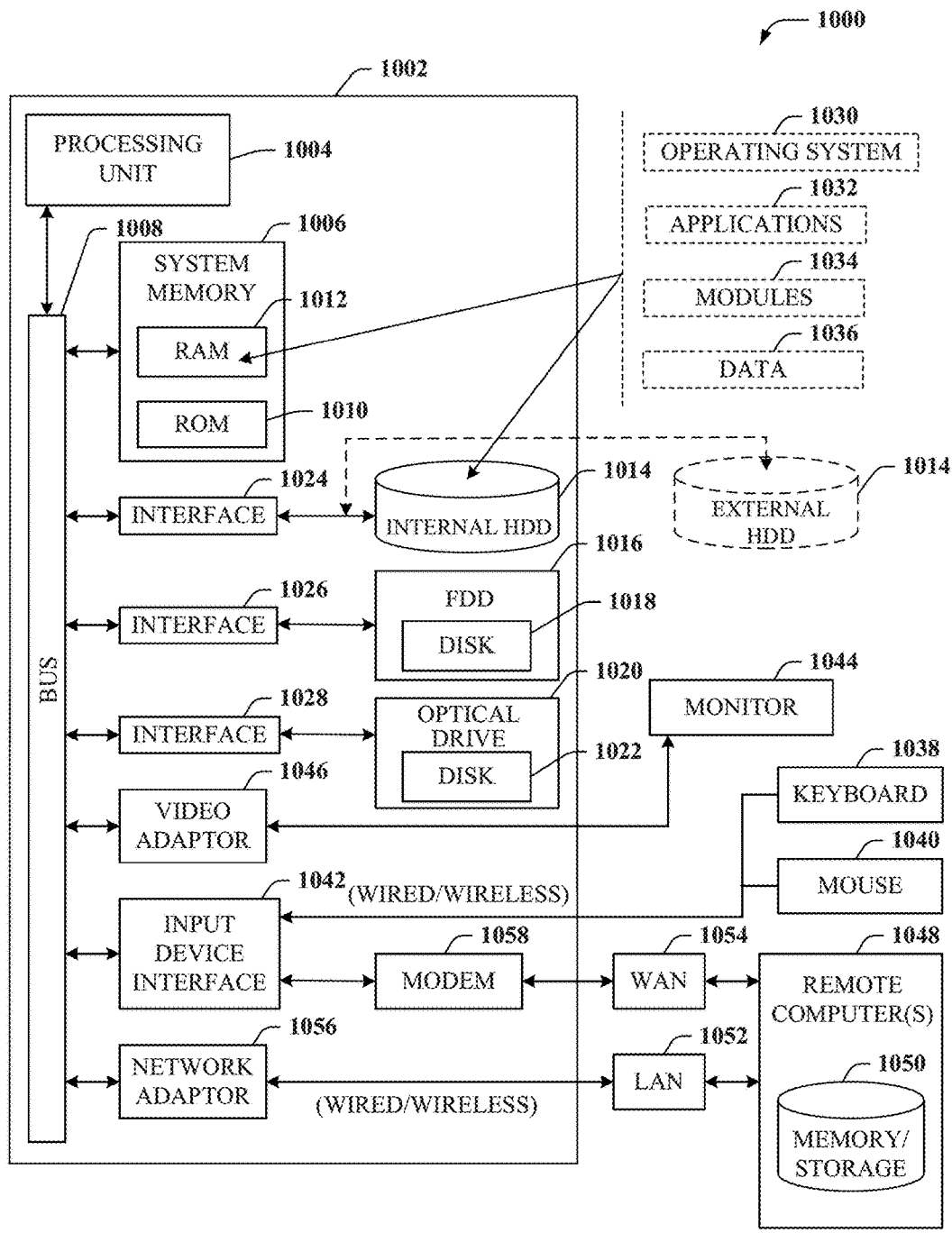
FIG. 10 is a schematic block diagram illustrating a suitable operating environment in accordance with various aspects and embodiments.

Referring now to FIG. 10, there is illustrated a block diagram of a computing environment in accordance with various aspects described herein. For example, in some embodiments, the computer can be or be included within the distributed antenna system disclosed in any of the previous systems 100 and 200 and devices 102, 400, 500, and 600.

In order to provide additional context for various embodiments described herein, FIG. 10 and the following discussion are intended to provide a brief, general description of a suitable computing environment 1000 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The terms "first," "second," "third," and so forth, as used in the claims, unless otherwise clear by context, is for clarity only and doesn't otherwise indicate or imply any order in time. For instance, "a first determination," "a second determination," and "a third determination," does not indicate or imply that the first determination is to be made before the second determination, or vice versa, etc.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media and/or communications media, which two terms are used herein differently from one another as follows. Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD) or other optical disk storage, magnetic cassettes, magnetic tape, magnetic disk storage or other magnetic storage devices or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 10, the example environment 1000 for implementing various embodiments of the aspects described herein includes a computer 1002, the computer 1002 including a processing unit 1004, a system memory 1006 and a system bus 1008. The system bus 1008 couples system components including, but not limited to, the system memory 1006 to the processing unit 1004. The processing unit 1004 can be any of various commercially available processors. Dual microprocessors and other multi-processor architectures can also be employed as the processing unit 1004.

The system bus 1008 can be any of several types of bus structure that can further interconnect to a memory bus (with or without a memory controller), a peripheral bus, and a local bus using any of a variety of commercially available bus architectures. The system memory 1006 includes ROM 1010 and RAM 1012. A basic input/output system (BIOS) can be stored in a non-volatile memory such as ROM, erasable programmable read only memory (EPROM), EEPROM, which BIOS contains the basic routines that help to transfer information between elements within the computer 1002, such as during startup. The RAM 1012 can also include a high-speed RAM such as static RAM for caching data.

The computer 1002 further includes an internal hard disk drive (HDD) 1014 (e.g., EIDE, SATA), which internal hard disk drive 1014 can also be configured for external use in a suitable chassis (not shown), a magnetic floppy disk drive (FDD) 1016, (e.g., to read from or write to a removable diskette 1018) and an optical disk drive 1020, (e.g., reading a CD-ROM disk 1022 or, to read from or write to other high capacity optical media such as the DVD). The hard disk drive 1014, magnetic disk drive 1016 and optical disk drive 1020 can be connected to the system bus 1008 by a hard disk drive interface 1024, a magnetic disk drive interface 1026 and an optical drive interface 1028, respectively. The interface 1024 for external drive implementations includes at least one or both of Universal Serial Bus (USB) and Institute of Electrical and Electronics Engineers (IEEE) 10104 interface technologies. Other external drive connection technologies are within contemplation of the embodiments described herein.

The drives and their associated computer-readable storage media provide nonvolatile storage of data, data structures, computer-executable instructions, and so forth. For the computer 1002, the drives and storage media accommodate the storage of any data in a suitable digital format. Although the description of computer-readable storage media above refers to a hard disk drive (HDD), a removable magnetic diskette, and a removable optical media such as a CD or DVD, it should be appreciated by those skilled in the art that other types of storage media which are readable by a computer, such as zip drives, magnetic cassettes, flash memory cards, cartridges, and the like, can also be used in the example operating environment, and further, that any such storage media can contain computer-executable instructions for performing the methods described herein.

A number of program modules can be stored in the drives and RAM 1012, including an operating system 1030, one or more application programs 1032, other program modules 1034 and program data 1036. All or portions of the operating system, applications, modules, and/or data can also be cached in the RAM 1012. The systems and methods described herein can be implemented utilizing various commercially available operating systems or combinations of operating systems.

A user can enter commands and information into the computer 1002 through one or more wired/wireless input devices, e.g., a keyboard 1038 and a pointing device, such as a mouse 1040. Other input devices (not shown) can include a microphone, an infrared (IR) remote control, a joystick, a game pad, a stylus pen, touch screen or the like. These and other input devices are often connected to the processing unit 1004 through an input device interface 1042 that can be coupled to the system bus 1008, but can be connected by other interfaces, such as a parallel port, an IEEE 13104 serial port, a game port, a universal serial bus (USB) port, an IR interface, etc.

A monitor 1044 or other type of display device can be also connected to the system bus 1008 via an interface, such as a video adapter 1046. In addition to the monitor 1044, a computer typically includes other peripheral output devices (not shown), such as speakers, printers, etc.

The computer 1002 can operate in a networked environment using logical connections via wired and/or wireless communications to one or more remote computers, such as a remote computer(s) 1048. The remote computer(s) 1048 can be a workstation, a server computer, a router, a personal computer, portable computer, microprocessor-based entertainment appliance, a peer device or other common network node, and typically includes many or all of the elements described relative to the computer 1002, although, for purposes of brevity, only a memory/storage device 1050 is illustrated. The logical connections depicted include wired/wireless connectivity to a local area network (LAN) 1052 and/or larger networks, e.g., a wide area network (WAN) 1054. Such LAN and WAN networking environments are commonplace in offices and companies, and facilitate enterprise-wide computer networks, such as intranets, all of which can connect to a global communications network, e.g., the Internet.

When used in a LAN networking environment, the computer 1002 can be connected to the local network 1052 through a wired and/or wireless communication network interface or adapter 1056. The adapter 1056 can facilitate wired or wireless communication to the LAN 1052, which can also include a wireless AP disposed thereon for communicating with the wireless adapter 1056.

When used in a WAN networking environment, the computer 1002 can include a modem 1058 or can be connected to a communications server on the WAN 1054 or has other means for establishing communications over the WAN 1054, such as by way of the Internet. The modem 1058, which can be internal or external and a wired or wireless device, can be connected to the system bus 1008 via the input device interface 1042. In a networked environment, program modules depicted relative to the computer 1002 or portions thereof, can be stored in the remote memory/storage device 1050. It will be appreciated that the network connections shown are example and other means of establishing a communications link between the computers can be used.

The computer 1002 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This can include Wireless Fidelity (Wi-Fi) and BLUETOOTH® wireless technologies. Thus, the communication can be a predefined structure as with a conventional network or simply an ad hoc communication between at least two devices.

Wi-Fi can allow connection to the Internet from a couch at home, a bed in a hotel room or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, n, ac, etc.) to provide secure, reliable, fast wireless connectivity. A Wi-Fi network can be used to connect computers to each other, to the Internet, and to wired networks (which can use IEEE 802.3 or Ethernet). Wi-Fi networks operate in the unlicensed 2.4 and 5 GHz radio bands, at an 11 Mbps (802.11a) or 54 Mbps (802.11b) data rate, for example or with products that contain both bands (dual band), so the networks can provide real-world performance similar to the basic 15BaseT wired Ethernet networks used in many offices.

Figure 11:
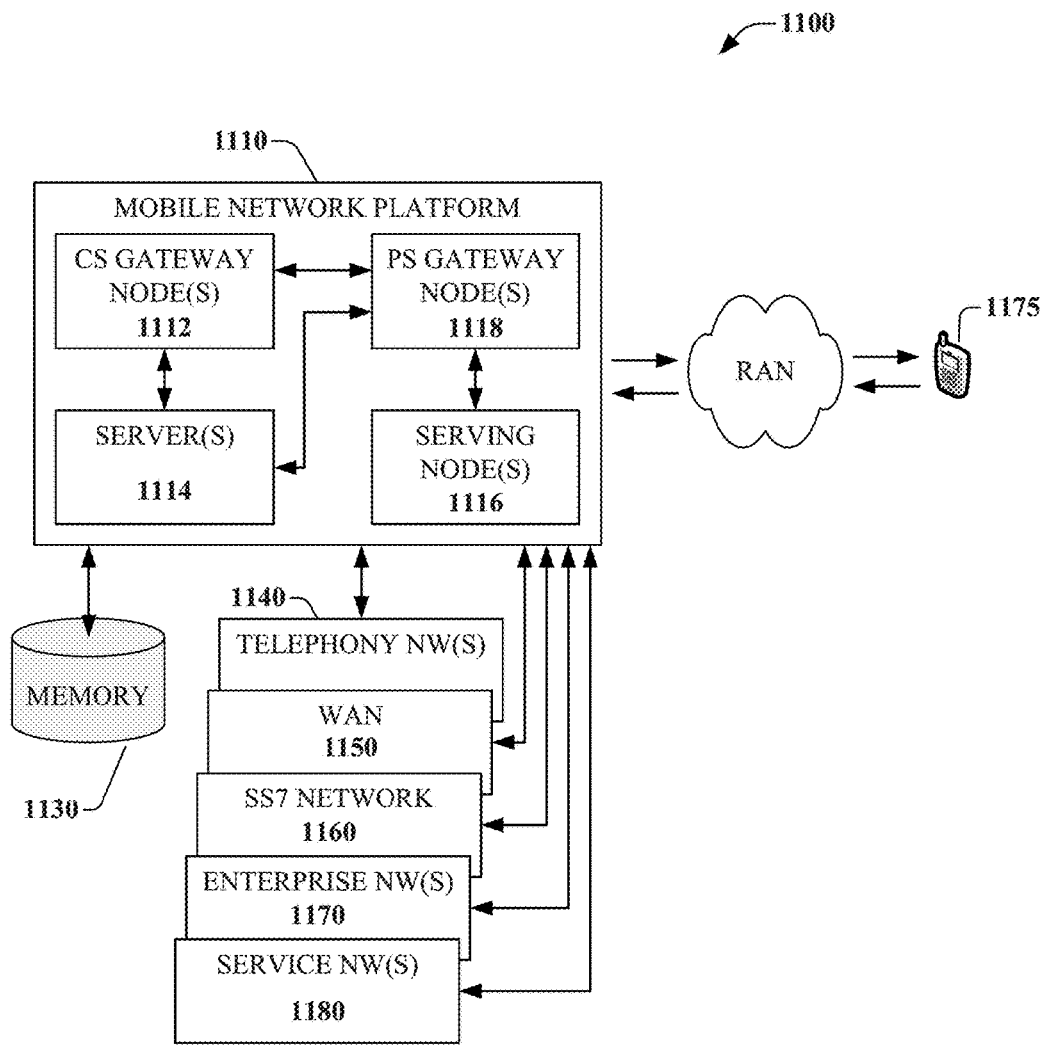
FIG. 11 is a schematic block diagram of a sample-computing environment in accordance with various aspects and embodiments.

FIG. 11 presents an example embodiment 1100 of a mobile network platform 1110 that can implement and exploit one or more aspects of the disclosed subject matter described herein. Generally, wireless network platform 1110 can include components, e.g., nodes, gateways, interfaces, servers, or disparate platforms, that facilitate both packet-switched (PS) (e.g., internet protocol (IP), frame relay, asynchronous transfer mode (ATM)) and circuit-switched (CS) traffic (e.g., voice and data), as well as control generation for networked wireless telecommunication. As a non-limiting example, wireless network platform 1110 can be included in telecommunications carrier networks, and can be considered carrier-side components as discussed elsewhere herein. Mobile network platform 1110 includes CS gateway node(s) 1112 which can interface CS traffic received from legacy networks like telephony network(s) 1140 (e.g., public switched telephone network (PSTN), or public land mobile network (PLMN)) or a signaling system #7 (SS7) network 1170. Circuit switched gateway node(s) 1112 can authorize and authenticate traffic (e.g., voice) arising from such networks. Additionally, CS gateway node(s) 1112 can access mobility, or roaming, data generated through SS7 network 1170; for instance, mobility data stored in a visited location register (VLR), which can reside in memory 1130. Moreover, CS gateway node(s) 1112 interfaces CS-based traffic and signaling and PS gateway node(s) 1118. As an example, in a 3GPP UMTS network, CS gateway node(s) 1112 can be realized at least in part in gateway GPRS support node(s) (GGSN). It should be appreciated that functionality and specific operation of CS gateway node(s) 1112, PS gateway node(s) 1118, and serving node(s) 1116, is provided and dictated by radio technology(ies) utilized by mobile network platform 1110 for telecommunication.

In addition to receiving and processing CS-switched traffic and signaling, PS gateway node(s) 1118 can authorize and authenticate PS-based data sessions with served mobile devices. Data sessions can include traffic, or content(s), exchanged with networks external to the wireless network platform 1110, like wide area network(s) (WANs) 1150, enterprise network(s) 1170, and service network(s) 1180, which can be embodied in local area network(s) (LANs), can also be interfaced with mobile network platform 1110 through PS gateway node(s) 1118. It is to be noted that WANs 1150 and enterprise network(s) 1160 can embody, at least in part, a service network(s) like IP multimedia subsystem (IMS). Based on radio technology layer(s) available in technology resource(s) 1117, packet-switched gateway node(s) 1118 can generate packet data protocol contexts when a data session is established; other data structures that facilitate routing of packetized data also can be generated. To that end, in an aspect, PS gateway node(s) 1118 can include a tunnel interface (e.g., tunnel termination gateway (TTG) in 3GPP UMTS network(s) (not shown)) which can facilitate packetized communication with disparate wireless network(s), such as Wi-Fi networks.

In embodiment 1100, wireless network platform 1110 also includes serving node(s) 1116 that, based upon available radio technology layer(s) within technology resource(s) 1117, convey the various packetized flows of data streams received through PS gateway node(s) 1118. It is to be noted that for technology resource(s) 1117 that rely primarily on CS communication, server node(s) can deliver traffic without reliance on PS gateway node(s) 1118; for example, server node(s) can embody at least in part a mobile switching center. As an example, in a 3GPP UMTS network, serving node(s) 1116 can be embodied in serving GPRS support node(s) (SGSN).

For radio technologies that exploit packetized communication, server(s) 1114 in wireless network platform 1110 can execute numerous applications that can generate multiple disparate packetized data streams or flows, and manage (e.g., schedule, queue, format . . . ) such flows. Such application(s) can include add-on features to standard services (for example, provisioning, billing, customer support . . . ) provided by wireless network platform 1110. Data streams (e.g., content(s) that are part of a voice call or data session) can be conveyed to PS gateway node(s) 1118 for authorization/authentication and initiation of a data session, and to serving node(s) 1116 for communication thereafter. In addition to application server, server(s) 1114 can include utility server(s), a utility server can include a provisioning server, an operations and maintenance server, a security server that can implement at least in part a certificate authority and firewalls as well as other security mechanisms, and the like. In an aspect, security server(s) secure communication served through wireless network platform 1110 to ensure network's operation and data integrity in addition to authorization and authentication procedures that CS gateway node(s) 1112 and PS gateway node(s) 1118 can enact. Moreover, provisioning server(s) can provision services from external network(s) like networks operated by a disparate service provider; for instance, WAN 1150 or Global Positioning System (GPS) network(s) (not shown). Provisioning server(s) can also provision coverage through networks associated to wireless network platform 1110 (e.g., deployed and operated by the same service provider), such as femto-cell network(s) (not shown) that enhance wireless service coverage within indoor confined spaces and offload RAN resources in order to enhance subscriber service experience within a home or business environment by way of UE 1175.

It is to be noted that server(s) 1114 can include one or more processors configured to confer at least in part the functionality of macro network platform 1110. To that end, the one or more processor can execute code instructions stored in memory 1130, for example. It is should be appreciated that server(s) 1114 can include a content manager 1115, which operates in substantially the same manner as described hereinbefore.

In example embodiment 1100, memory 1130 can store information related to operation of wireless network platform 1110. Other operational information can include provisioning information of mobile devices served through wireless platform network 1110, subscriber databases; application intelligence, pricing schemes, e.g., promotional rates, flat-rate programs, couponing campaigns; technical specification(s) consistent with telecommunication protocols for operation of disparate radio, or wireless, technology layers; and so forth. Memory 1130 can also store information from at least one of telephony network(s) 1140, WAN 1150, enterprise network(s) 1160, or SS7 network 1170. In an aspect, memory 1130 can be, for example, accessed as part of a data store component or as a remotely connected memory store.

In the subject specification, terms such as "store," "storage," "data store," data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can include both volatile and nonvolatile memory, by way of illustration, and not limitation, volatile memory 1120 (see below), non-volatile memory 1122 (see below), disk storage 1124 (see below), and memory storage 1146 (see below). Further, nonvolatile memory can be included in read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

As used in this application, in some embodiments, the terms "component," "system" and the like are intended to refer to, or include, a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, computer-executable instructions, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor, wherein the processor can be internal or external to the apparatus and executes at least a part of the software or firmware application. As yet another example, a component can be an apparatus that provides specific functionality through electronic components without mechanical parts, the electronic components can include a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

Further, the various embodiments can be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable device or computer-readable storage/communications media. For example, computer readable storage media can include, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

In addition, the words "example" and "exemplary" are used herein to mean serving as an instance or illustration. Any embodiment or design described herein as "example" or "exemplary" is not necessarily to be construed as preferred or advantageous over other embodiments or designs. Rather, use of the word example or exemplary is intended to present concepts in a concrete fashion. As used in this application, the term "or" is intended to mean an inclusive "or" rather than an exclusive "or". That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms such as "user equipment," "mobile station," "mobile," subscriber station," "access terminal," "terminal," "handset," "mobile device" (and/or terms representing similar terminology) can refer to a wireless device utilized by a subscriber or user of a wireless communication service to receive or convey data, control, voice, video, sound, gaming or substantially any data-stream or signaling-stream. The foregoing terms are utilized interchangeably herein and with reference to the related drawings.

Furthermore, the terms "user," "subscriber," "customer," "consumer" and the like are employed interchangeably throughout, unless context warrants particular distinctions among the terms. It should be appreciated that such terms can refer to human entities or automated components supported through artificial intelligence (e.g., a capacity to make inference based, at least, on complex mathematical formalisms), which can provide simulated vision, sound recognition and so forth.

As employed herein, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components or any combination thereof designed to perform the functions described herein. Processors can exploit nano-scale architectures such as, but not limited to, molecular and quantum-dot based transistors, switches and gates, in order to optimize space usage or enhance performance of user equipment. A processor can also be implemented as a combination of computing processing units.

As used herein, terms such as "data storage," data storage," "database," and substantially any other information storage component relevant to operation and functionality of a component, refer to "memory components," or entities embodied in a "memory" or components comprising the memory. It will be appreciated that the memory components or computer-readable storage media, described herein can be either volatile memory or nonvolatile memory or can include both volatile and nonvolatile memory.

Memory disclosed herein can include volatile memory or nonvolatile memory or can include both volatile and nonvolatile memory. By way of illustration, and not limitation, nonvolatile memory can include read only memory (ROM), programmable ROM (PROM), electrically programmable ROM (EPROM), electrically erasable PROM (EEPROM) or flash memory. Volatile memory can include random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). The memory (e.g., data storages, databases) of the embodiments are intended to comprise, without being limited to, these and any other suitable types of memory.

What has been described above includes mere examples of various embodiments. It is, of course, not possible to describe every conceivable combination of components or methodologies for purposes of describing these examples, but one of ordinary skill in the art can recognize that many further combinations and permutations of the present embodiments are possible. Accordingly, the embodiments disclosed and/or claimed herein are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A first mobile device, comprising:
a processor; and
a memory that stores executable instructions that, when executed by the processor, facilitate performance of operations, comprising:
facilitating establishing a direct wireless connection with a cellular network via a radio access network device of the cellular network;
operating as an access point device to the cellular network for a second mobile device located within a defined coverage area associated with the radio access network device based on a determination that a current level of congestion associated with the defined coverage area exceeds a threshold level of congestion, wherein the first wireless communication device and the second wireless communication device are wireless communication devices utilized by a subscriber of the cellular network, and wherein the operating as the access point device comprises:
facilitating establishing an ad-hoc wireless connection with the second mobile device; and
facilitating a relay of data between the radio access network device and the second mobile device via the direct wireless connection and the ad-hoc wireless connection;
monitoring both first data communication activity on the direct wireless connection and second data communication activity on the ad-hoc wireless connection;
disconnecting the direct wireless connection with the radio access network device after detecting a first period of data communication inactivity on the direct wireless connection; and
disconnecting the ad-hoc wireless connection with the second mobile device after detecting a second period of data communication inactivity on the ad-hoc wireless connection, wherein the second period has a longer duration than the first period.

2. The first mobile device of claim 1, wherein the operating as the cellular network access point device is further based on reception, by the first mobile device, of a request from a network device of the cellular network for the first mobile device to operate as the cellular network access point device.

3. The first mobile device of claim 2, wherein the request is received based on the determination and the establishing of the direct wireless connection.

4. The first mobile device of claim 3, wherein the request comprises a first request, and wherein the operations further comprise:

ceasing the operating as the cellular network access point device based on reception, by the first mobile device, of a second request from the network device to cease the operating as the cellular network access point device, and wherein the second request is received based on a third determination that the current level of congestion has decreased.

5. The first mobile device of claim 2, wherein the request further defines a duration of time for the operating as the cellular network access point device, and wherein the operations further comprise:
ceasing the operating as the cellular network access point device based on passage of the duration of time from a start of the operating.

6. The first mobile device of claim 2, wherein the request is received based on a signal strength of the direct wireless connection.

7. The first mobile device of claim 2, wherein the request is received based on a current location of the first mobile device being located within the defined coverage area.

8. The first mobile device of claim 1, wherein the determination is a first determination and wherein the operating as the cellular network access point device is further based on a second determination that user accounts with the cellular network, respectively associated with the first mobile device and the second mobile device, are registered for participation in a cellular connection sharing service of the cellular network.

9. A method, comprising:
facilitating, by a first mobile device comprising a processor, establishing a direct wireless connection with a cellular network via a radio access network device of the cellular network;
receiving, by the first mobile device, a request from a second mobile device located within a defined coverage area associated with the radio access network device, to use the first mobile device as an access point device to connect to the cellular network wherein the first mobile device and the second mobile device are wireless communication devices utilized by a subscriber of the cellular network;
operating, by the first mobile device, as an access point to the cellular network for the second mobile device based on the receiving the request and a determination that a current level of congestion associated with the defined coverage area exceeds a threshold level of congestion, wherein the operating as the access point device comprises:
facilitating establishment of an ad-hoc wireless connection with the second mobile device; and
acting as a relay for data between the radio access network device and the second mobile device via the direct wireless connection and the ad-hoc wireless connection;
monitoring, by the first mobile device, both first data communication activity over the direct wireless connection and second data communication activity over the ad-hoc wireless connection;
disconnecting the direct wireless connection with the radio access network device in response to a first detection of a first period of data communication inactivity over the direct wireless connection; and
disconnecting the ad-hoc wireless connection with the second mobile device in response to a second detection of a second period of data communication inactivity over the ad-hoc wireless connection, wherein the second period has a longer duration than the first period.

10. The method of claim 9, wherein the request comprises a first request, and wherein the method further comprises:
receiving, by the first mobile device, a second request from a network device of the cellular network for the first mobile device to operate as the access point device, wherein the operating as the access point device is further based on the receiving the second request.

11. The method of claim 10, wherein the receiving the second request is based on a current location of the first mobile device being within the defined coverage area.

12. The method of claim 10, wherein the receiving the second request is based on the determination and establishment of the direct wireless connection.

13. The method of claim 10, further comprising:
receiving, by the first mobile device, a third request from the network device to cease the operating as the access point device based on a third determination that the current level of congestion has decreased; and
ceasing, by the first mobile device, the operating as the access point device based on the receiving the third request.

14. The method of claim 10, wherein the second request further defines a duration of time for the operating as the cellular network access point device, and wherein the operations further comprise:
ceasing the operating as the cellular network access point device based on passage of the duration of time from a start of the operating.

15. The method of claim 10, wherein the receiving the second request is further based on a signal strength of the direct wireless connection.

16. The method of claim 10, wherein the determination is a first determination and wherein the operating as the cellular network access point device is further based on a second determination that user accounts with the cellular network, respectively associated with the first mobile device and the second mobile device, are registered for participation in a cellular connection sharing service of the cellular network.

17. A non-transitory machine-readable storage medium, comprising executable instructions that, when executed by a processor of a first mobile device, facilitate performance of operations, comprising:
operating as an access point device to a cellular network for a second mobile device located within a defined coverage area associated with a radio access network device of the cellular network based on establishment of a direct wireless connection between the first mobile device and the radio access network device and a determination that a current level of congestion associated with the defined coverage area exceeds a threshold level of congestion, wherein the first mobile device and the second mobile device are wireless communication devices utilized by a subscriber of the cellular network, and wherein the operating as the access point device comprises:
facilitating establishing an ad-hoc wireless connection with the second mobile device; and
relaying data between the radio access network device and the second mobile device via the direct wireless connection and the ad-hoc wireless connection;
monitoring both first data communication activity over the direct wireless connection and second data communication activity over the ad-hoc wireless connection; and
ceasing the operating as the access point device to the cellular network based on disconnecting the direct wireless connection with the radio access network device after a first detection of a first time period of data communication inactivity over the direct wireless connection, and further based on disconnecting the ad-hoc wireless connection with the second mobile device after a second detection of a second time period of data communication inactivity over the ad-hoc wireless connection, wherein the second time period is longer than the first time period.

18. The non-transitory machine-readable storage medium of claim 17, wherein the determination is a first determination and wherein the operating as the cellular network access point device is further based on a second determination that user accounts with the cellular network, respectively associated with the first mobile device and the second mobile device, are registered for participation in a cellular connection sharing service of the cellular network.

19. The non-transitory machine-readable storage medium of claim 17, wherein the operating as the cellular network access point device is further based on receiving a request from a network device of the cellular network requesting the first mobile device to operate as the cellular network access point device.

20. The non-transitory machine-readable storage medium of claim 19, wherein the request is received based on a current location of the first mobile device being located within the defined coverage area and a number of additional mobile devices within the defined coverage area capable of serving as access point devices to the cellular network.

* * * * *